US010325373B2

(12) United States Patent
Kwant et al.

(10) Patent No.: US 10,325,373 B2
(45) Date of Patent: Jun. 18, 2019

(54) METHOD, APPARATUS, AND SYSTEM FOR CONSTRUCTING A POLYGON FROM EDGES FOR OBJECT DETECTION

(71) Applicant: HERE GLOBAL B.V., Eindhoven (NL)

(72) Inventors: Richard Kwant, Oakland, CA (US); Anish Mittal, Berkeley, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 93 days.

(21) Appl. No.: 15/698,091

(22) Filed: Sep. 7, 2017

(65) Prior Publication Data
US 2019/0073774 A1 Mar. 7, 2019

(51) Int. Cl.
*G06K 9/00* (2006.01)
*G06T 7/12* (2017.01)
*G06T 7/143* (2017.01)

(52) U.S. Cl.
CPC ............ *G06T 7/12* (2017.01); *G06K 9/00818* (2013.01); *G06T 7/143* (2017.01)

(58) Field of Classification Search
CPC ........ G06T 7/12; G06T 7/143; G06K 9/00818
USPC .......................................................... 382/103
See application file for complete search history.

(56) References Cited

U.S. PATENT DOCUMENTS

| 5,805,170 A | 9/1998 | Burch |
| 6,307,554 B1 | 10/2001 | Arai et al. |
| 6,897,859 B2 | 5/2005 | Ohta |
| 7,091,988 B2 | 8/2006 | Hori et al. |
| 8,150,131 B2 | 4/2012 | Harer et al. |
| 8,170,372 B2 | 5/2012 | Kennedy et al. |
| 2003/0174877 A1 | 9/2003 | Aiger |
| 2011/0249867 A1* | 10/2011 | Haas ................. G06K 9/00818 382/103 |
| 2014/0270362 A1* | 9/2014 | Najafi Shoushtari ........ G06K 9/6204 382/103 |

* cited by examiner

*Primary Examiner* — Andrew M Moyer
(74) *Attorney, Agent, or Firm* — Ditthavong & Steiner, P.C.

(57) ABSTRACT

An approach is provided for constructing polygons for object detection. The approach involves processing, by a computer vision system, an image to generate a cell-based parametric representation of object edges. The representation, for instance, segments the image into cells with each cell including a predicted line segment representing a portion of the object edges, and a predicted centroid of the object. The approach also involves grouping the cells into cell groups based on the predicted line segment for each cell. The approach further involves generating a line to represent each cell group based on the predicted line segment for each cell of each cell group. The approach further involves constructing the polygon to represent the corresponding object based on a half planes coincident with the predicted centroid for at least one cell. Each half plane is created by bisecting a plane with the line generated for each cell group.

20 Claims, 23 Drawing Sheets

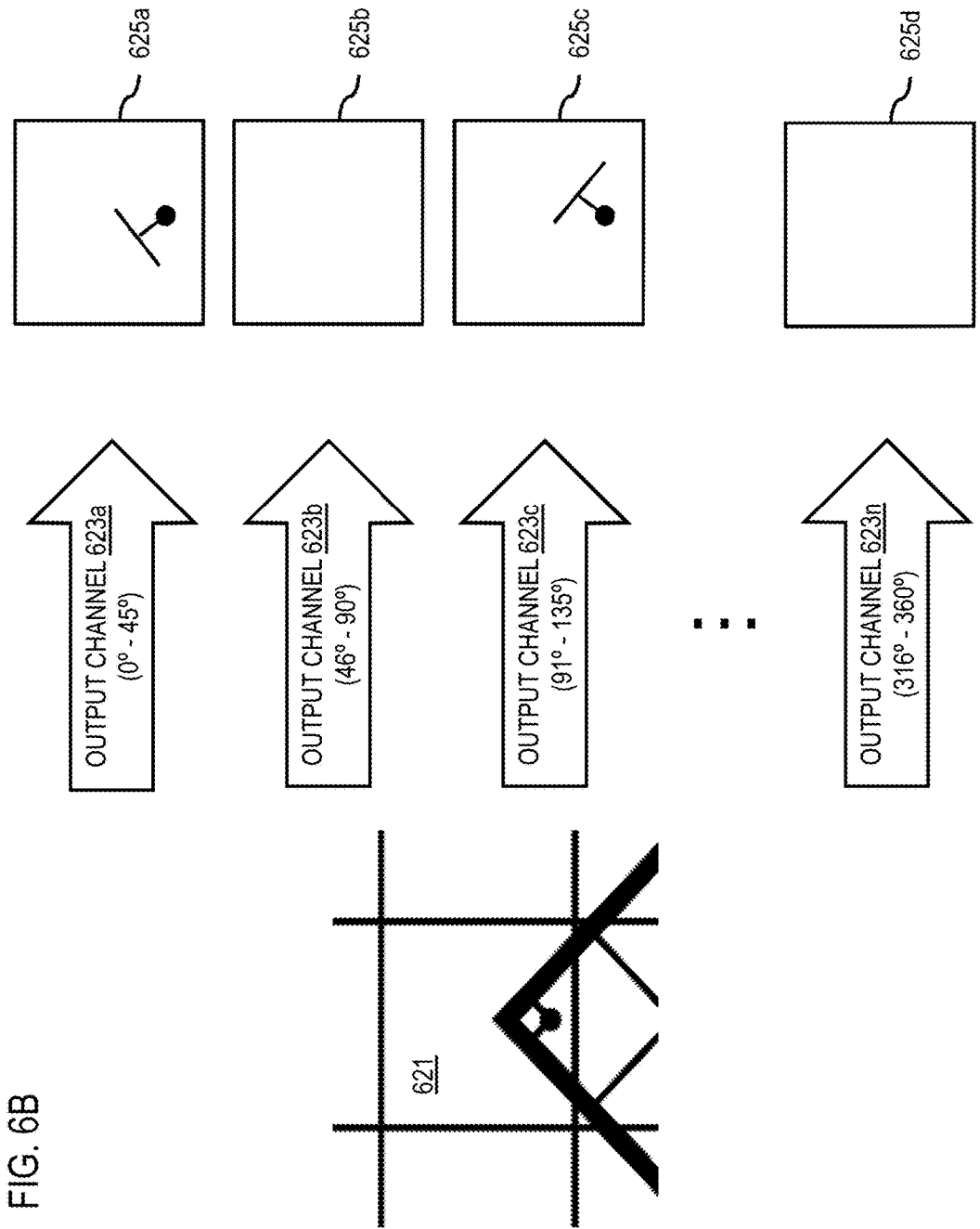

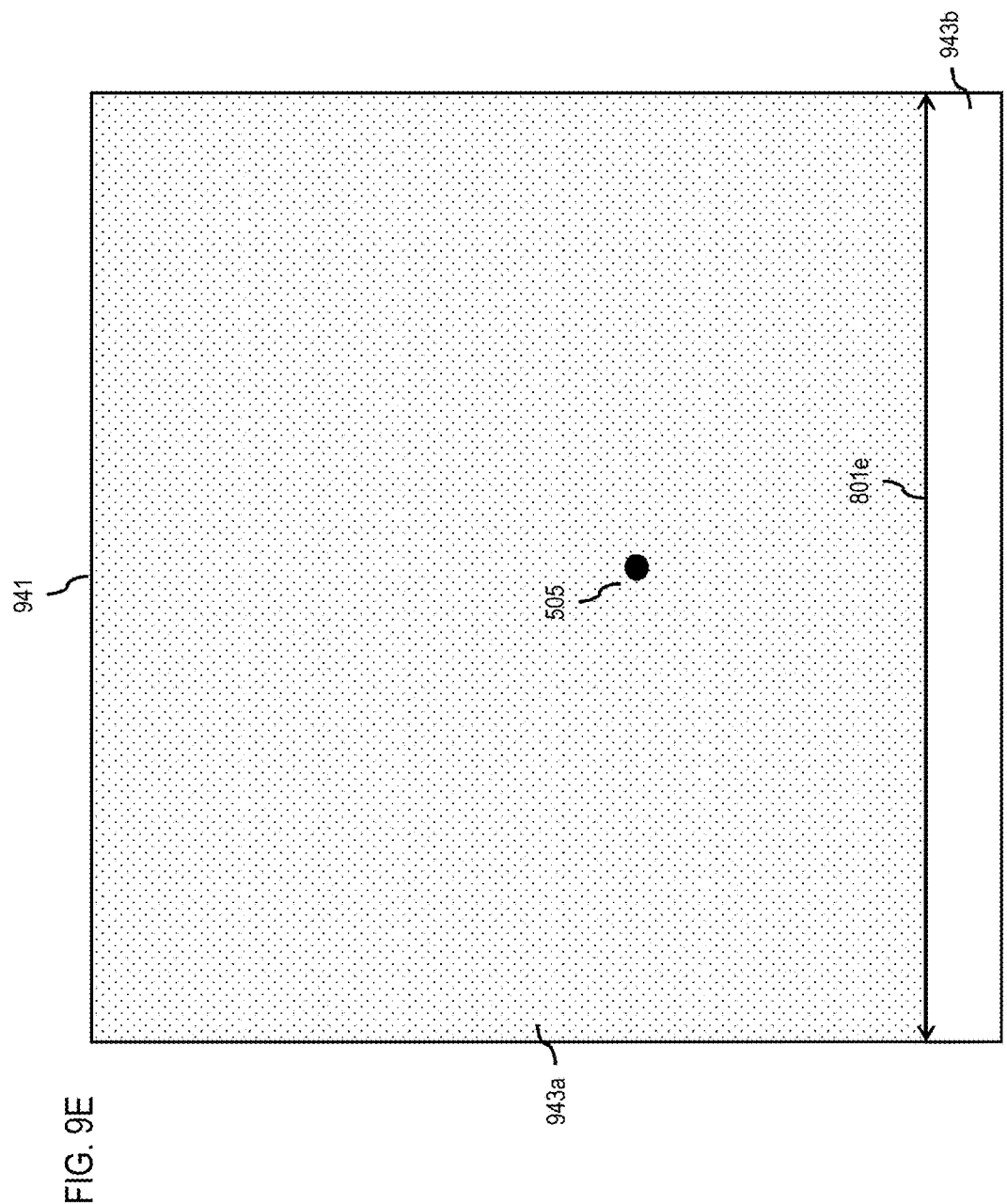

METHOD, APPARATUS, AND SYSTEM FOR CONSTRUCTING A POLYGON FROM EDGES FOR OBJECT DETECTION

BACKGROUND

Autonomous driving has quickly become an area of interest for vehicle manufacturers and navigation and mapping service providers. One particular area of interest is the use of computer vision to enable mapping and sensing of a vehicle's environment to support autonomous or semi-autonomous operation. Advances in available computing power have enabled mapping and sensing to approach or achieve real-time operation through, for instance, machine learning (e.g., neural networks). As a result, one application of vision techniques in autonomous driving is providing information about the environment by detecting road signs and/or other objects near a travel route. In some cases, to achieve real-time performance, a computer vision system can segment or divide an input image into smaller subunits which can then be processed by multiple processing nodes of neural networks in parallel. However, because of this parallel processing, each processing node independently outputs only a portion of the recognized object (e.g., a portion of an object's edge). As a result, there remains significant technical challenges to recombining the multiple independent outputs of these processing nodes into a single coherent representation of the detected object.

SOME EXAMPLE EMBODIMENTS

Therefore, there is a need for constructing a polygon from edges represented in the outputs of a computer vision system for object detection.

According to one embodiment, a computer-implemented method for constructing a polygon to represent an object detected by a computer vision system comprises processing, by the computer vision system, an image to generate a cell-based parametric representation of one or more edges of the object as depicted in the image. The cell-based parametric representation segments the image into a plurality of cells, and each cell of the plurality of cells includes a predicted line segment representing a portion of the one or more edges, and a predicted centroid of the object. The method also comprises grouping the plurality of cells into a plurality of cell groups based on the predicted line segment for said each cell. The method further comprises generating a line to represent each cell group of the plurality of cell groups based on the predicted line segment for said each cell of said each cell group. The method further comprises constructing the polygon to represent the object based on a plurality of half planes coincident with the predicted centroid for one or more of said each cell. Each half plane of the plurality of half planes is created by bisecting a plane with the line generated for said each cell group.

According to another embodiment, an apparatus for constructing a polygon to represent an object detected by a computer vision system comprises at least one processor, and at least one memory including computer program code for one or more computer programs, the at least one memory and the computer program code configured to, with the at least one processor, cause, at least in part, the apparatus to process, by the computer vision system, an image to generate a cell-based parametric representation of one or more edges of the object as depicted in the image. The cell-based parametric representation segments the image into a plurality of cells, and each cell of the plurality of cells includes a predicted line segment representing a portion of the one or more edges, and a predicted centroid of the object. The apparatus is also caused to group the plurality of cells into a plurality of cell groups based on the predicted line segment for said each cell. The apparatus is further caused to generate a line to represent each cell group of the plurality of cell groups based on the predicted line segment for said each cell of said each cell group. The apparatus is further caused to construct the polygon to represent the object based on a plurality of half planes coincident with the predicted centroid for one or more of said each cell. Each half plane of the plurality of half planes is created by bisecting a plane with the line generated for said each cell group.

According to another embodiment, a non-transitory computer-readable storage medium for constructing a polygon to represent an object detected by a computer vision system carries one or more sequences of one or more instructions which, when executed by one or more processors, cause, at least in part, an apparatus to process, by the computer vision system, an image to generate a cell-based parametric representation of one or more edges of the object as depicted in the image. The cell-based parametric representation segments the image into a plurality of cells, and each cell of the plurality of cells includes a predicted line segment representing a portion of the one or more edges, and a predicted centroid of the object. The apparatus is also caused to group the plurality of cells into a plurality of cell groups based on the predicted line segment for said each cell. The apparatus is further caused to generate a line to represent each cell group of the plurality of cell groups based on the predicted line segment for said each cell of said each cell group. The apparatus is further caused to construct the polygon to represent the object based on a plurality of half planes coincident with the predicted centroid for one or more of said each cell. Each half plane of the plurality of half planes is created by bisecting a plane with the line generated for said each cell group.

According to another embodiment, an apparatus for constructing a polygon to represent an object detected by a computer vision system comprises means for processing, by the computer vision system, an image to generate a cell-based parametric representation of one or more edges of the object as depicted in the image. The cell-based parametric representation segments the image into a plurality of cells, and each cell of the plurality of cells includes a predicted line segment representing a portion of the one or more edges, and a predicted centroid of the object. The apparatus also comprises means for grouping the plurality of cells into a plurality of cell groups based on the predicted line segment for said each cell. The apparatus further comprises means for generating a line to represent each cell group of the plurality of cell groups based on the predicted line segment for said each cell of said each cell group. The apparatus further comprises means for constructing the polygon to represent the object based on a plurality of half planes coincident with the predicted centroid for one or more of said each cell. Each half plane of the plurality of half planes is created by bisecting a plane with the line generated for said each cell group.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6B is a diagram illustrating a multi-channel output of a parametric representation of detected object edges, according to one embodiment;

FIGS. 9A-9E are diagrams illustrating examples of creating and selecting half-planes that are coincident with a predicted centroid of a detected object, according to one embodiment;

DESCRIPTION OF SOME EMBODIMENTS

Examples of a method, apparatus, and computer program for constructing a polygon from edges for object detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
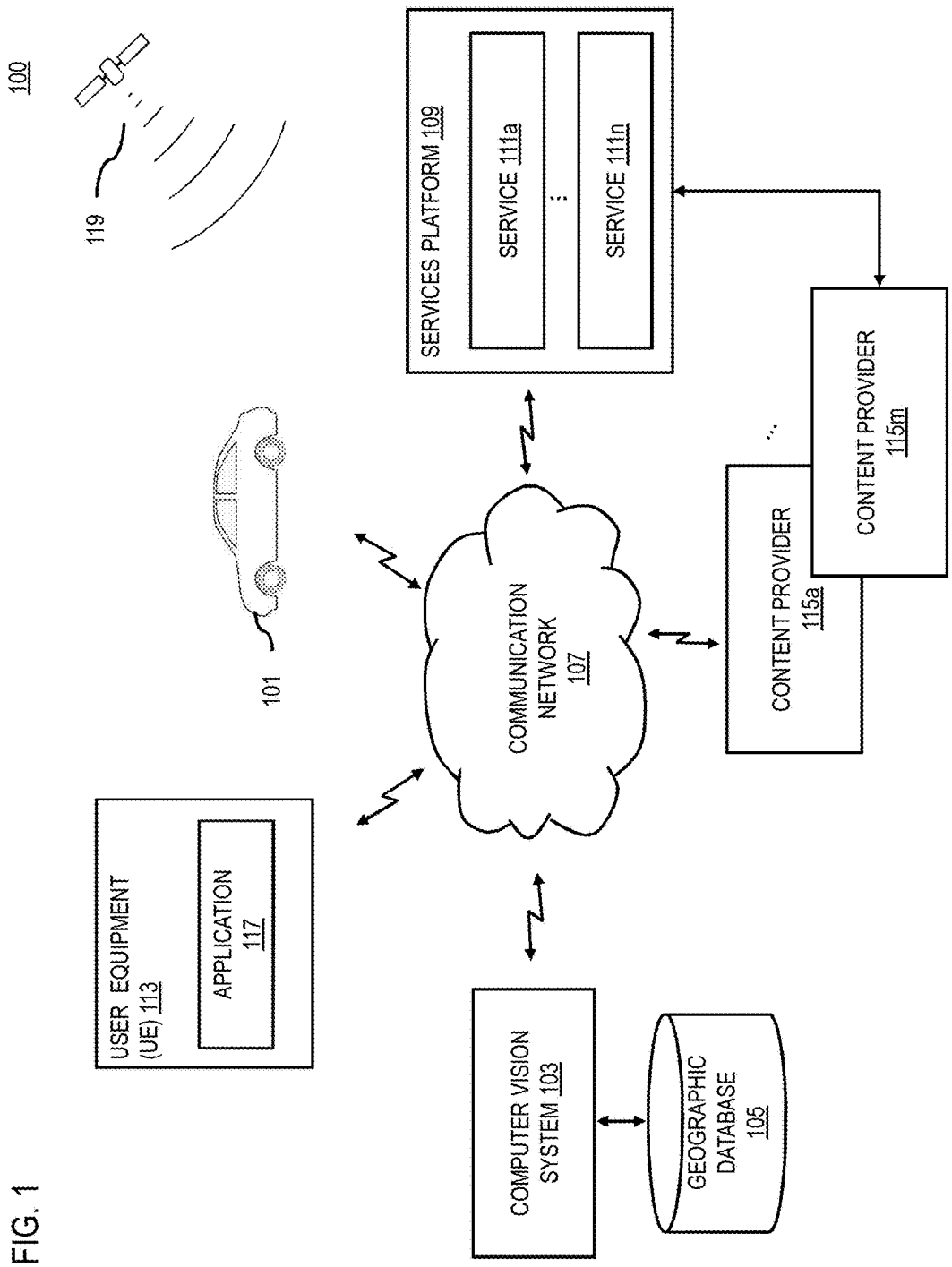
FIG. 1 is a diagram of a system capable of constructing a polygon from edges for object detection, according to one embodiment.

FIG. 1 is a diagram of a system capable of constructing a polygon from edges for object detection, according to one embodiment. As discussed above, autonomous driving has quickly become an area of intense interest, with recent advances in machine learning, computer vision and compute power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. At least some of this information can be provided by signs detected near travel routes. These signs, for instance, include both road signs and well as any other sign visible from a travel route (e.g., store signs, billboards, etc.). More fundamentally, vehicles 101 can use a semantic understanding of what areas around them are navigable and safe for driving based in part on such signs. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a computer vision system 103).

A second application of vision techniques in autonomous driving is localization of the vehicle 101 with respect to a map of reference landmarks (e.g., with respect to known sign locations). Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to localization (e.g., localization to a more accurate position in a roadway such as in a specific lane) and also generally with respect to autonomous driving, high accuracy and real-time localization of vehicles 101 is needed. Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUS) can increase the accuracy of localization by taking into account vehicle movement, but these sensors tend to drift and still do not provide sufficient accuracy for localization.

Figure 2:
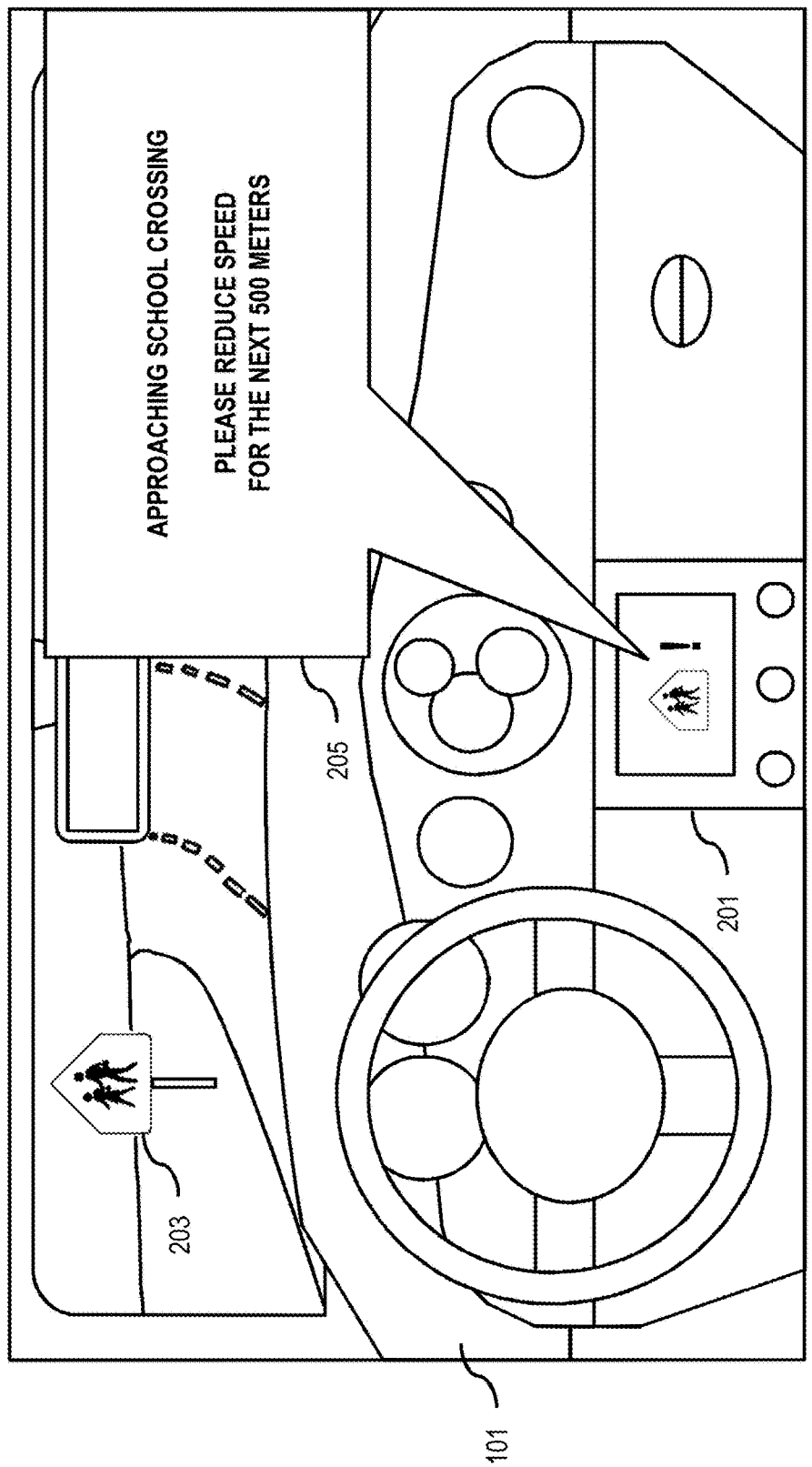
FIG. 2 is diagram illustrating example vehicle navigation system that can obtain environmental information and/or employ localization based on objects detected from images, according to one embodiment.

In general, a localization accuracy of around 10 cm is needed for safe driving in many areas. One way to achieve this level of accuracy is to use visual odometry, in which features (e.g., signs) are detected from imagery. These features can then be matched to a database of features (e.g., indexed to an accurate location of the feature) to determine one's location. For example, FIG. 2 illustrates a vehicle 101 equipped with a navigation or autonomous vehicle control system 201 that employs an embodiment of a computer vision-based localization system as described herein. In this example, the vehicle control system 201 uses a computer vision system according to the embodiments described herein to detect a road sign 203 that indicates the vehicle 101 is approaching an upcoming school crossing. The vehicle control system 201 can either slow down autonomously or provide an alert to the driver of the vehicle 101 to manually slow down. By employing visual odometry with respect to the detected sign 203, the control system 201 can more accurately localize a position of the vehicle 101 to enhance safety while traveling through the approaching school crossing.

In contrast, traditional feature-based localization that both detects features and localizes against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types can provide better and more accurate localization with higher confidence.

Accordingly, in one embodiment, a fundamental component of autonomous driving relates to the detection of features in the surrounding environment. In the physical world, features can consist of a myriad of objects, from lane lines to hot air balloons, but any autonomous driving software must represent them somehow. A variety of representations for these features exist, but within the scope of two-dimensional image processing, there generally can be two fundamental types of objects: lines and polygons. For example, lines can be used to represent linear objects like lane lines or the horizon. Polygons can be used to represent any discrete object whose boundary consists of a closed linear ring.

The challenge with modern computer vision lies in generating these representations of these or objects as detected in image data using, for instance, neural networks. Neural networks typically output tensors with a fixed number of values, yet lines and polygons can have arbitrary complexity in terms of the number of parameters needed to encode them. As a result, it is often easier to break these representations into smaller parts that are independently predicted by different parts of a network responsible for different parts of the image. For example, a computer vision system employing a neural network might place a grid over an image, and each cell is responsible for predicting linear segments that lie within it. However, each cell outputs a separate prediction, which presents a significant technical challenge for the computer vision to stitch the predicted edges or features together to construct a coherent polygonal representation of the detected object.

In one embodiment, the system 100 of FIG. 1 uses a flexible approach to parametrically represent an object or object model in such a way that the detected object can be easily and robustly represented in a processed by a computer vision system comprising multiple processing nodes such as a neural network. In one embodiment, the system 100 encodes a polygon representing a detected sign as a set of edges that are associated with a predicted center point of the object. Each edge is predicted independently by output cells of the computer vision system (e.g., a neural network) that are close to the edge, such that, in one embodiment, edges are encoded redundantly by multiple output cells or processing nodes. This redundancy increases the robustness of the detection and allows for more accurate localization because duplicate predictions can be used to produce a single, smooth prediction. This representation enables the encoding of detected objects with arbitrary numbers of edges that are at arbitrary angles. However, as noted above the conversion between the encoded (e.g., cell-based parametric representations) and decoded representations (e.g., a polygonal model) of detected objects can greatly affect the efficiency and potential advantages parameter representations of objects have over other traditional representations. Therefore, providing a computationally cheap and efficient process for converting parametric representations (e.g., edges) to polygons presents a significant technical challenge.

To address this challenge, the system 100 of FIG. 1 introduces a capability to construct a polygon to represent an object detected in an image from a set of predicted line segments and a predicted centroid for the polygon. In one embodiment, the system 100 turns every line segment predicted in a cell-based representation of a detected object edges into a half plane by using the centroid prediction to determine which side of the line is on the inside of the polygon. The intersection of the resulting set of half planes is then taken to produce an output polygon. In one embodiment, this process can be iterative such that the system 100 can iteratively add additional detected object edges to the output polygon until the output polygon meets specified criteria (e.g., creates a closed polygon, uses all detected edges that are predicted above a threshold confidence level, or reaches a programmable maximum number of edges).

Although the various embodiments described herein discuss a computer vision system 103 that employs a neural network (e.g., a convolutional neural network) to recognize objects or road signs in input image data, it is contemplated that any type of computer vision system 103 using any other machine learning technique or other image processing technique can use the embodiments described herein to construct a polygon from cell-based representations of detected object edges. In addition, although various examples discuss the parametric representations of edges and corresponding polygon construction with respect to road signs, it is also contemplated that the parametric representations can be used to represent any object with defined edges in captured image data.

Moreover, although various embodiments are discussed with respect to a using object detection for autonomous driving, it is contemplated that object detection and the embodiments describe herein are applicable to any computer vision use case. For example, object detection from image data (e.g., rasterized images or a sequence of images, such as a video, made from pixels) is spurring intense interest in the development of other new and compelling use cases and/or services in addition to autonomous driving such as, but not limited to, video surveillance, the internet of things (IoT), and/or the like. For example, in the case of video surveillance, the detected objects might be faces, people, or vehicles captured by a surveillance camera; in IoT, they might include shipping containers, items cooking in an oven, and/or any other object of interest to an IoT device; and for autonomous driving, they might include roadside signs, guardrails, or other vehicles captured by an autonomous vehicle 101.

Figure 3:
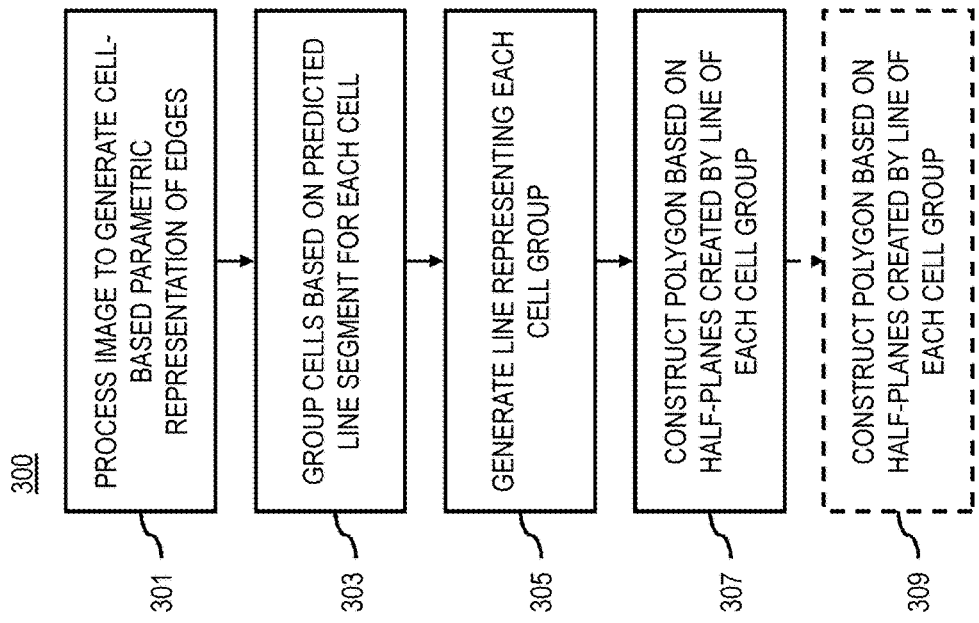
FIG. 3 is a flowchart of a process for constructing a polygon from edges for object detection, according to one embodiment.
Figure 15:
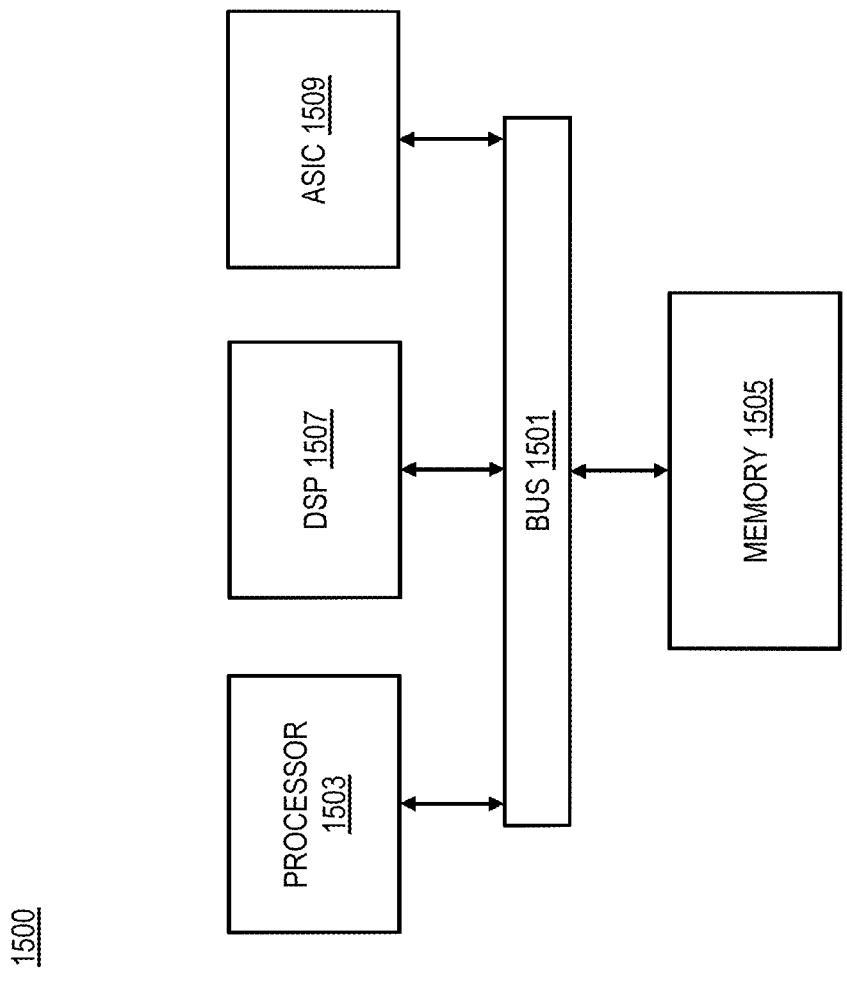
FIG. 15 is a diagram of a chip set that can be used to implement an embodiment of the invention.

FIG. 3 is a flowchart of a process for constructing a polygon from edges for object detection, according to one embodiment. In one embodiment, the computer vision system 103 may perform one or more portions of the process 300 and may be implemented in, for instance, a chip set including a processor and a memory as shown in FIG. 15. As such, the computer vision system 103 can provide means for accomplishing various parts of the process 300. In addition or alternatively, the services platform 109 and/or services 111 may perform any combination of the steps of the process 300 in combination with the computer vision system 103 or as standalone components. Although the process 300 is illustrated and described as a sequence of steps, it is contemplated that various embodiments of the process 300 may be performed in any order or combination and need not include all of the illustrated steps.

In step 301, the computer vision system 103 processes an image to generate a cell-based parametric representation of one or more edges of the object as depicted in the image. In one embodiment, as discussed above, the cell-based parametric representation segments the image into multiple cells (e.g., plurality of cells) by using, for instance, a grid pattern. The computer vision system 103 can then assign a different processing node (e.g., a neural network processing node) to each cell of the image. In this way, each cell of the image can be processed by the respective node (e.g., in parallel) to determine a predicted line segment representing a portion of one or more edges of a detected object that may be visible in the corresponding portion of the image. In one embodiment, each cell can also include a predicted centroid of the detected object. It is noted that a cell-based representation of detected edges is provided by illustration and not limitation. Accordingly, it is contemplated that the various embodiments describe herein are also applicable to any representation of detected object objects where the edges can have one or more multiple predictions with associated confidence levels.

Figure 4:
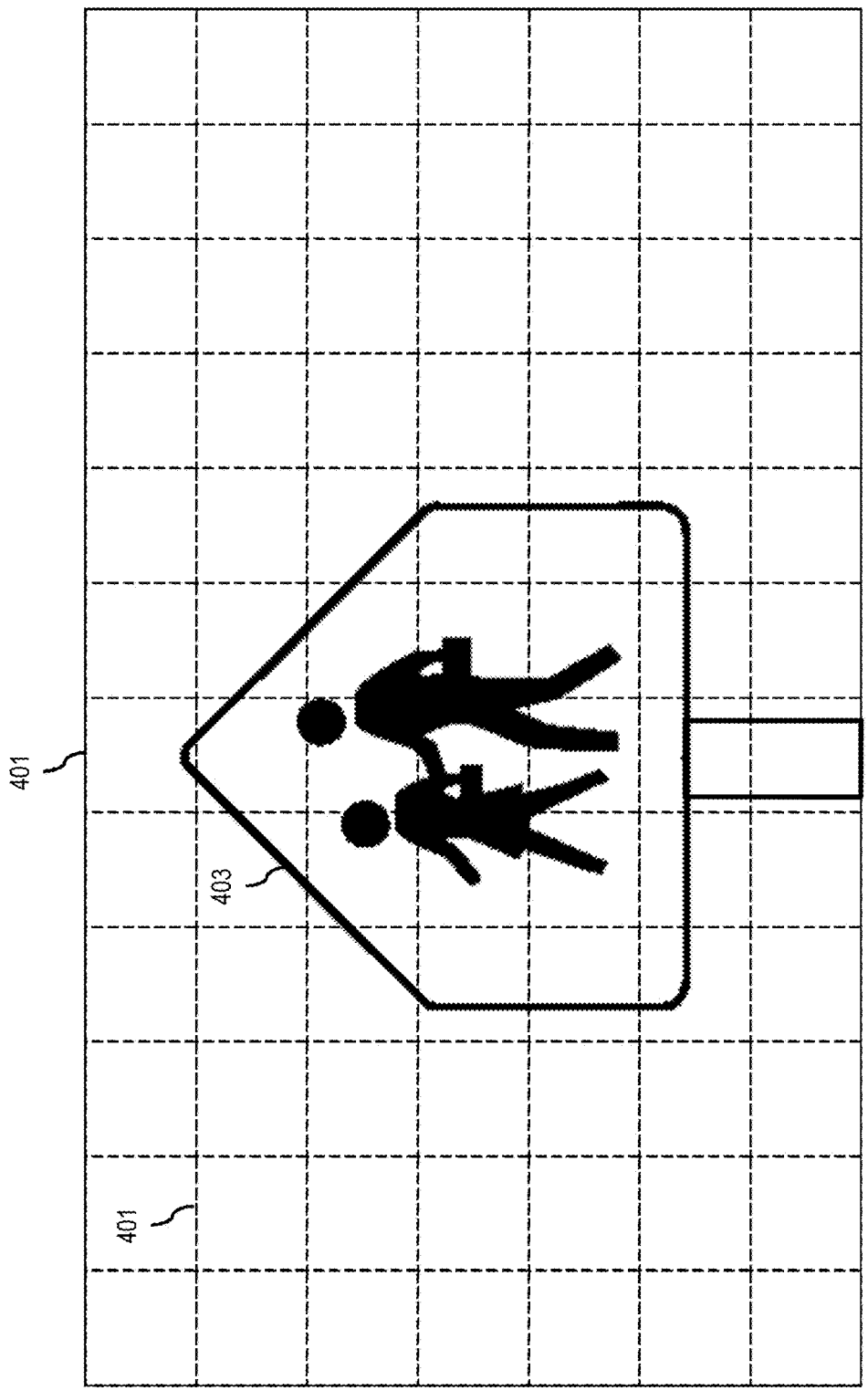
FIG. 4 is a diagram of an input image overlaid with a grid, according to one embodiment.

FIG. 4 illustrates an example input image 401 that depicts a road sign 403 that is to be detected. In this example, the road sign 403 represents an object of interest that is to be detected by the computer vision system 103. In one embodiment, the input image 401 can be captured in real-time by a camera system of the vehicle 101 as one or more raster images at a predetermined pixel resolution. In addition, the input image 401 can be captured using cameras sensitive to visible light, infra-red, and/or any other wavelength of light. To support real-time operation, the input image 401 can be part of an image stream captured at a relatively high frequency (e.g., 10 Hz, 20 Hz, 30 Hz, or higher). Each frame of the image stream can then be processed to provide real-time detection of objects of interest such as the road sign 403.

To initiate processing of the image 401, the computer vision system 103 divides the image 401 into cells based on, for instance, a grid 405. In one embodiment, each cell of the image 401 (or a corresponding processing node) is responsible processing its corresponding portion of the image data of the image 401 to predict any object edges depicted in nearby cells as line segments. By way of example, the computer vision system 103 can configure a threshold distance for determining whether a cell is nearby or proximate to a given line segment or edge of a detected object or sign. In one embodiment, distance is measured with respect to the grid dividing the input image. As noted above, when an input image is divided into grid cells, the system 100 also designates processing nodes or neurons for processing the image data in that cell. In one embodiment, a processing node or cell can also process image data from other cells that are passed to the cell (e.g., as described with passing image data to a central node when that central node is responsible for processing image data for the entire sign as described above). In this way, any cell that is within the threshold distance of an edge of a detected object or sign can independently make a prediction of the attributes of the edge (e.g., position, angle, predicted object center or centroid, etc.), so that when multiple nearby cells make a prediction, multiple predictions can be processed to determine a more robust overall prediction. In one embodiment, "independently" refers to a cell or processing node making its own prediction based on the portion of the image data within its scope (e.g., the portion of the input image falling within the grid cell to which it is assigned, and/or the portion of the input image falling in the nearby cells within the distance threshold). Additional embodiments and details of the process of generating a parametric representation are discussed with respect to FIG. 13 below. It is contemplated that the various embodiments and example of the processes for creating a cell-based representation of a detected object as described herein are provided by way of illustration and not as limitations. Accordingly, it is contemplated that the computer vision system 103 can use any equivalent process to generate an equivalent cell-based parametric representation of objects detected in images.

Figure 5:
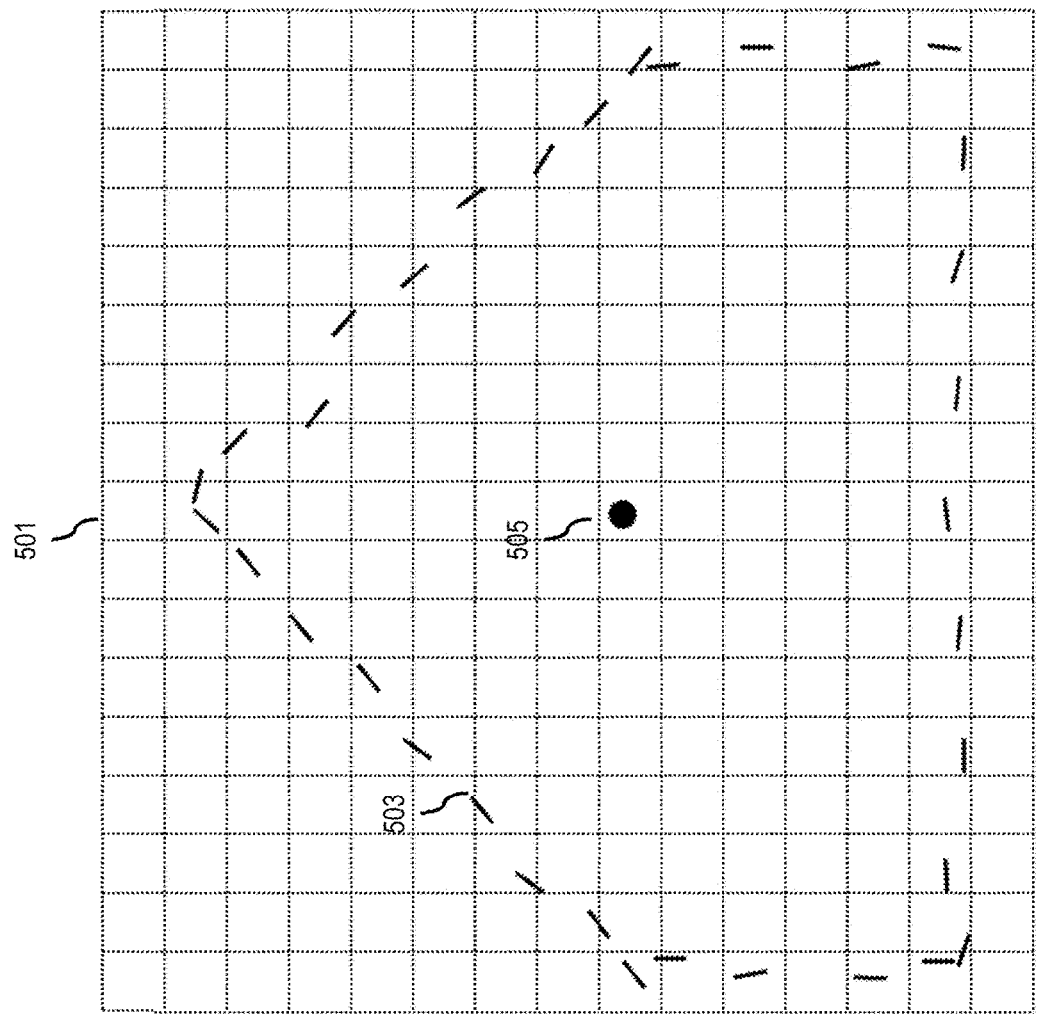
FIG. 5 is a diagram illustrating an example of a grid cell-based representation of a detected object, according to one embodiment.

FIG. 5 is a diagram illustrating an example of a grid cell-based representation 501 of a detected object, according to one embodiment. FIG. 5 continues the example of FIG. 4 and shows a cell-based representation 501 that can be result from the process of the image 401 of FIG. 4 to detected the sign 403. In this example, each cell makes an independent prediction of line segments 503 representing any object edges depicted in its corresponding area of the input image 401, as well as a predicted centroid 505 of the detected object. Accordingly, the grid cell-based representation 501 (e.g., a cell-based parametric representation) is an aggregation of the individual predictions made for each cell, which can be denoted as follows:

$$o_{parametric} = \{Edge_{cell\ 1}, \ldots, Edge_{cell\ n}\}$$

where $o_{parametric}$ is the cell-based parametric representation of an object detected in an image divided into cells 1 to n, and $Edge_{cell\ 1}$ to $Edge_{cell\ n}$ are the predicted line segments and centroids of any edges detected in the portion of the image corresponding to each cell, denoted, e.g., as $Edge_{cell\ x} = <Line_{cell\ x}, Centroid_{cell\ x}>$ for a given cell x of the image. In one embodiment, the predicted edges (and/or line segments and centroids) are predicted by the computer vision system 103 by extracting pixel features from the image data corresponding to each cell, and then using machine learning (e.g., a neural network) to predict the edge, line segment, and/or centroid of an object or portion of the object that may be depicted in the object. If no edge is detected in a particular cell above a threshold confidence level, the corresponding cell can be removed or not included in the cell-based representation. Alternatively, the such cells can be indicated as null values or equivalent to designate that no edge was detected in the cell.

Because the amount of image data is limited and each prediction is generally made without input or knowledge of the predictions of neighboring cells, the resulting predicted line segments can be noisy. In other words, as shown, there is variability in the predicted locations and angles for each line segment even when those line segments are likely representing the same continuous edge of the corresponding object (e.g., sign 403) or occur in close proximity of the same image area as shown in the differences between the locations and angles of the line segment predictions for the cells depicted in FIG. 5 even when located on the same object edge.

Figure 6A:
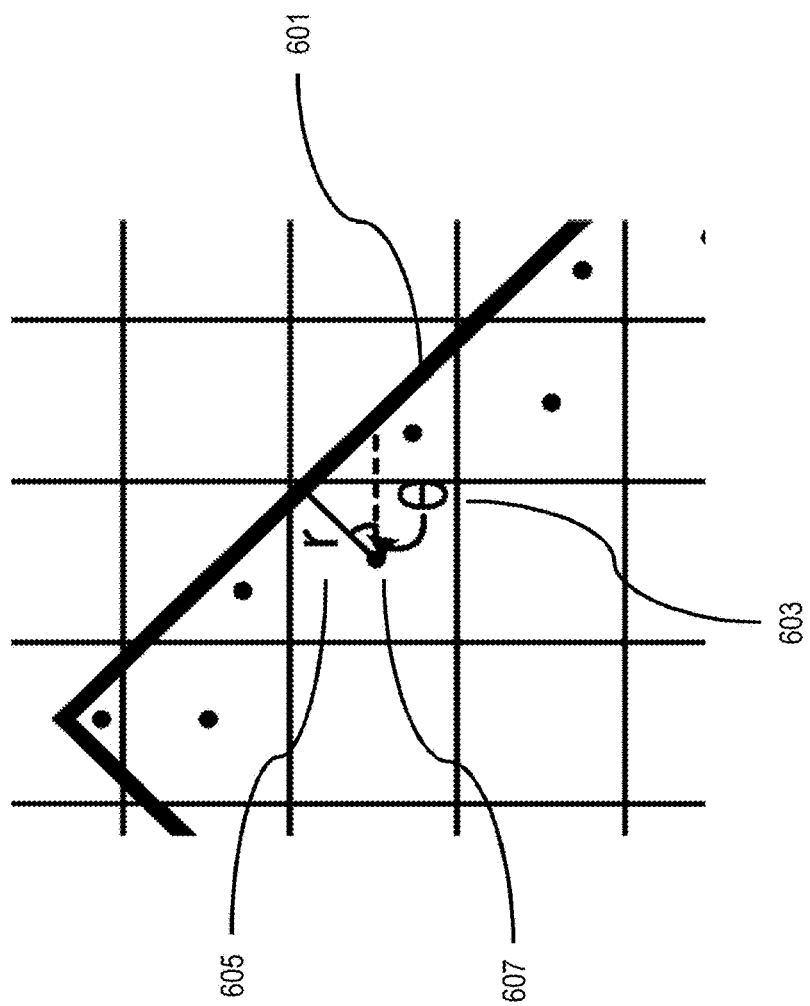
FIG. 6A is a diagram illustrating a parametric representation of a detected object edge, according to one embodiment.

In one embodiment, each predicted line segment is specified as a set of parameters representing a line that models the detected object edge (i.e., a parametric representation). For example, FIG. 6A is a diagram illustrating a parametric representation of a detected sign edge, according to one embodiment. In one embodiment, the computer vision system 103 encodes a detected sign edge in each cell as parameters representing at least a location and angle of the predicted edge in a parametric representation of the edge. In one embodiment, the computer vision system 103 determines and includes a confidence level for the detected edge as an additional parameter of the parametric representation. By way of example, the location and angle of the predicted edge can be indicated using an r-theta representation of the line with respect to a reference point and/or a reference angle for each grid cell. It is noted that r-theta representation is provided by way of illustration, and not as a limitation. It is contemplated that any equivalent system for indicating a line segment in a grid cell can be used according to the various embodiments described herein.

In an example using an r-theta representation as shown in FIG. 6A, the prediction of each edge (e.g., edge 601) can be encoded as three values: a confidence (not shown), an angle 603, and a radius 605. In one embodiment, the confidence value is 1 if the edge exists and 0 otherwise. In one embodiment, when generating edge predictions by a machine-learning based embodiment of the computer vision system 103 (e.g., a neural network), the confidence values are probabilities that a detected edge is an object edge (e.g., 0 corresponding to zero probability of being an object edge, 1 corresponding to a highest probability of being an object edge, and other values spanning the range to indicate different probabilities). To calculate the radius 605 and angle 603, the centroid 607 of the intersection of the detected object and the cell is first calculated to represent a reference point for the grid cell. By using the centroid 607 of the intersection (e.g., the portion of the image area in each cell that corresponds to the detected object's face or area) as the reference point, the centroid 607 is ensured to be located on the object face as opposed to a non-object portion of the image area. A line segment is drawn from the centroid 607 to the sign edge 601 such that it is perpendicular to the edge 601. The angle 603 (e.g., angle θ) is then the angle 603 that this line makes with a reference angle, and the radius 605 is the length of the line segment from the centroid 607 to the edge 601.

In one embodiment, the three values discussed above can be used to encode any line segment. In another embodiment, as shown in FIG. 6B, that computer vision system 103 can provide multiple such output channels 623a-623n (also collectively referred to as output channels 623) from each cell that are each responsible for a certain angular range. For example, a cell 621 could have output channels 623a-623n, each with a confidence, a radius, and an angle for any detected edge that falls within the angular range for the corresponding output channel 623. The first such output (e.g., output channel 623a) would be responsible for edges with angles between 0 and 45 degrees, the second (e.g., output channel 623b) between 46 and 90 degrees, and so on. These ranges are provided by way of illustration and not as limitation. It is contemplated that the computer vision system 103 can use any number of ranges (including just one range covering 0 to 360 degrees) that respectively span any angular range. This arrangement advantageously makes each output channel 623 an expert detector of lines that fall within a certain angular range. For example, narrower angular ranges for each output channel can enable each corresponding edge detector to become more specialized through machine learning, but can also increase complexity by increasing the overall number of detectors.

Although, the examples of FIGS. 4-6B depict a parametric representation of object edges in a two-dimensional grid, it is contemplated that the various embodiments described herein are also applicable to higher dimensional representations. For example, the parametric representations can be applied to an n-dimensional space, wherein n≥2, by representing the detected edges as a n−1 dimensional hyperplane. In the example of higher dimensions, three-dimensional or higher dimensional polygons can be constructed from n−1 dimensional hyperplanes as the detected edges.

Returning to the example of FIG. 5, each of the depicted line segments 503 of the cells is a prediction of a line corresponding to a detected edge or boundary of an object of interest. Therefore, the line segments 503 also correspond to an edge of a polygon that represents detected object. In other words, each edge of a polygonal representation of the detected object is predicted by a set of line segments 503. Each set of line segments 503 corresponding to a particular edge represents independent and redundant predictions of a line that represents a corresponding edge of the detected object. However, because of the variability of the edge prediction process, the edge predictions can be noisy. Additionally, the centroid 505 of the polygon is also predicted as a point by each cell. In this example, a single predicted centroid 505 is shown for illustration to represent each of the centroids predicted respectively for each cell, but this prediction can also be noisy because of the limited portion of image data and associated features that each cell uses to makes its respective prediction.

In one embodiment, the number of edges that a polygonal representation of the detected object can have is a programmable parameter of the computer vision system 103 and can be any number of n edges. In addition, because each detected edge is a prediction (e.g., a prediction resulting from a machine learning process of the computer vision system 103), each of the predicted line segments 503 can be associated with a confidence level of the respective edge or line segment predictions. For example, the confidence level indicates the degree to which the object edge features extracted from the input image by the computer vision system 103 are indicative of a detected object edge (e.g., each predicted line segment 503) in each grid cell of the input image. In one embodiment, the computer vision system 103 selects only those predicted line segments 503 or edges that have confidence levels above a threshold level to be used for polygon construction.

In one embodiment, either all the redundant edge predictions or only those predictions with confidences above a threshold level can be grouped by properties of the predicted edge or line segment (e.g., a predicted angle). These predictions can then be combined through averaging or other statistical process (e.g., median, maximum, minimum, etc.) to give smoothed predictions of the polygon exterior. The smoothed predictions, for instance, advantageously enables the computer vision system 103 to construct a more representative polygonal representation of the objects (e.g., by eliminating noisy edges) and reduce computer resources used to store and/or process the redundant predictions that can be replaced by the smoothed edge representation. In one embodiment, the polygon construction process can be an iterative process whereby the computer vision system 103 iteratively selects the detected or predicted line segments 503 or edges until at least one polygon construction criterion is meet. Examples of a polygon construction criterion include, but are not limited to: (1) adding edges to the polygon construction until the resulting polygon is closed; (2) adding edges to the polygon construction until there are no more detected or predicted edges that meet the confidence level threshold; and/or (3) addition edges to the polygon construction until the number of edges of the polygon meets a programmable maximum number of edges that at polygon can have.

Accordingly, in step 303, the computer vision system 103 groups the plurality of cells of the input image into a plurality of cell groups based on the predicted line segment for each cell. For example, each cell can represent a different edge of the output polygon. Therefore, in one embodiment, the number of cell groups can also be based on the number of edges needed to create a closed polygon, the number edges meeting confidence threshold values, and/or the programmable maximum number edges. By way of example, the computer vision system 103 can use any clustering or grouping process (e.g., k-means, DBSCAN, etc.) to group each cell by the similarities of the characteristics their respective predicted object edges or line segments (e.g., line locations, angles, etc.). For example, the predicted line segment can include a predicted angle of the predicted line segment. In this case, the plurality of cells of the image can be grouped into cell groups based on the predicted angle of each cell. In one embodiment, if there are multiple edges with the same or similar predicted angles, the computer vision system 103 can use the predicted locations of the line segments to determine whether there is a path (e.g., a linear path) between the grouped cells. In one embodiment, this grouping can be denoted as:

Cell Group$_i$={cell$_x$|cell$_x$∈,θ$_x$ is grouped with θ$_{Cell\ Group_i}$}, for $i$=1 to $n$ cell groups where n is the total number of cells groups, and θ$_{Cell\ Group_i}$ is the angle or angle range used for determining whether a cell, should be a member of the Cell Group$_i$.

Figure 7:
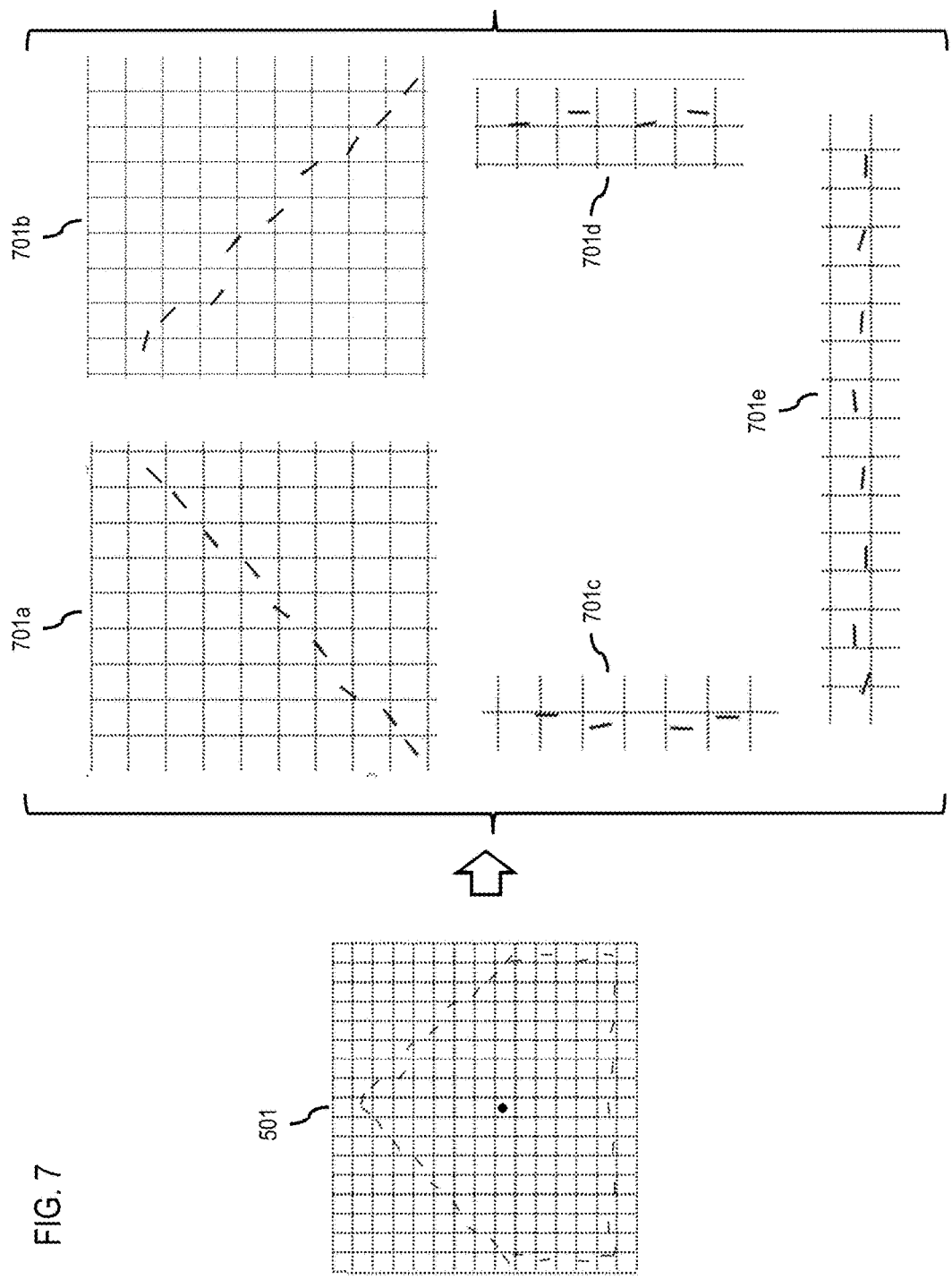
FIG. 7 is a diagram illustrating a grouping of cells into cell groups based on predicted line segments, according to one embodiment.

An example of this cell grouping process is provided with respect to FIG. 7, which is a diagram illustrating a grouping of cells into cell groups based on predicted line segments, according to one embodiment. FIG. 7 continues the example of FIG. 5 to initiate grouping of cells of the cell-based representation 501 according to their predicted line segments according to the embodiment described above. As shown, the computer vision system 103 groups the cells according to a predicted angle of the predicted line segments of each cell, so that cells with predicted angles that are similar (e.g., within a threshold range and/or other clustering criteria depending on the clustering algorithm or process used) are clustered into the same group. In this example, the cells of the cell-based representation 501 with predicted line segments are grouped into five cell groups 701a-701e (also collectively referred to as cell groups 701).

In one embodiment, each cell group 701 is a set of redundant predictions of a line segment or line representing a common edge of the detected object. The computer vision system 103 can then generate a smoothed prediction for each cell group 701. For example, in step 305, the computer vision system 103 generates a line to represent each cell group of the plurality of cell groups of the input image based on the predicted line segment for each cell of each cell group 701. As discussed above, in one embodiment, the predicted line segment for each cell includes a predicted angle and a predicted location of the line segment. The line to represent said cell group can then be generated based on the predicted angle and the predicted location of each cell. For example, the computer vision system 103 calculates an average angle for a cell group 701 by averaging the predicted angle of the line segment of each cell in the group 701, and/or an average location by averaging the predicted location of the line segment of each cell in the group 701. In addition or alternatively to average, the computer vision system 103 can use any other statistical estimate to calculate a representative angle and/or location for each group 701. These statistical estimates include, but are not limited to, a median, a maximum, a minimum, etc. In one embodiment, the line to represent each group 701 can then be generated based on the average or representative angle and/or average or representative location of each cell. It is noted that this process to generate a line is provided by way of illustration and not as a limitation. Accordingly, it is contemplated that the computer vision system 103 can use any known process for constructing a smoothed line from multiple lines segments including, but not limited to, selecting the line segment predicted with the highest confidence as the representative line, etc.

As described above, the multiple redundant predictions of the line segment or line representing a detected object edge provide for additional robustness of the prediction through averaging or other similar statistical processes (e.g. median, maximum, minimum, etc.). In addition or alternatively, the computer vision system 103 can bring consistency to the multiple line or edge predictions by introducing the multiple predictions in a loss function or other equivalent function. For example, the loss function can be used for parameter estimation of a representative line to make the multiple predictions consistent by using the multiple predictions as an input into a function of the difference between estimated and true values of the multiple predicted lines or edges. The computer vision system 103 can then use the estimated parameters of the line or edge determined from the loss function to generate the representative line for each cell group 701.

Figure 8:
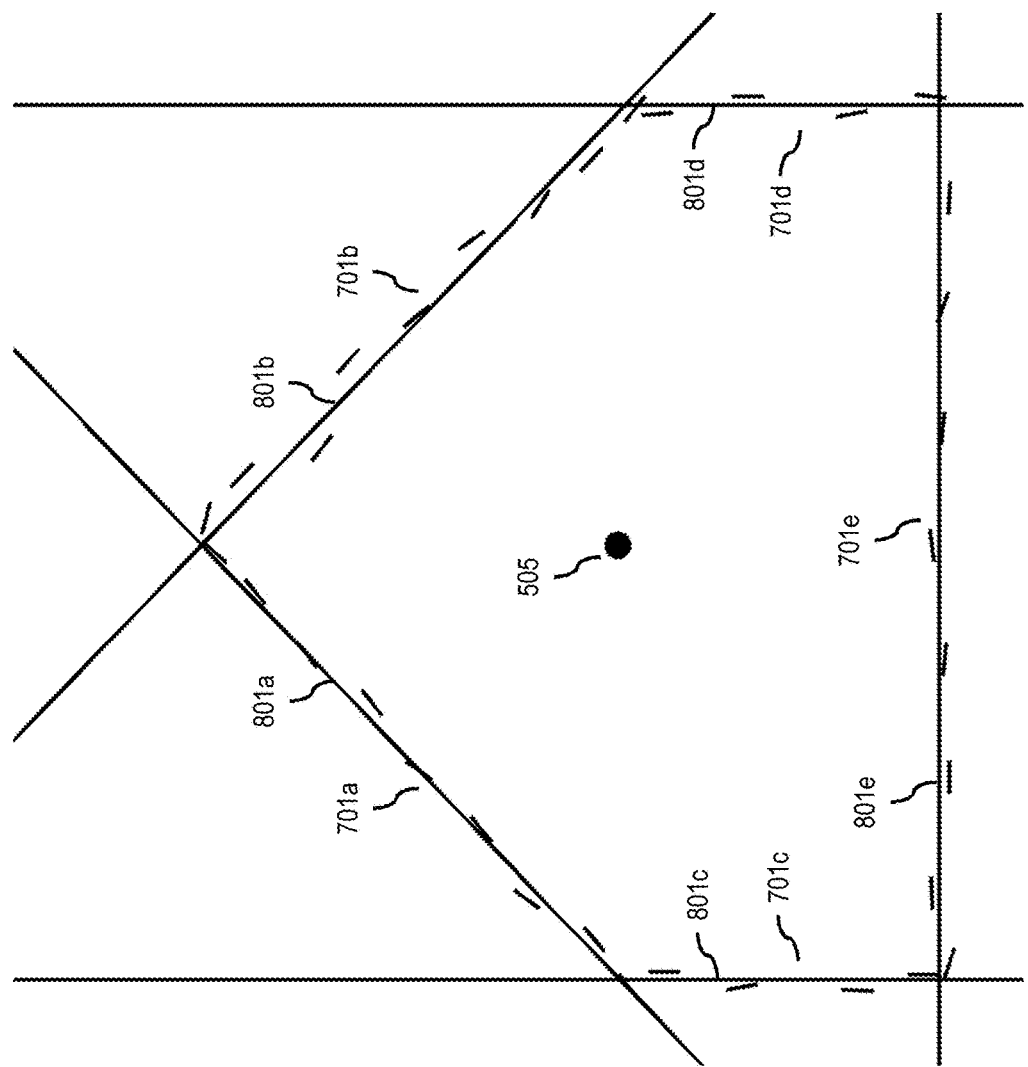
FIG. 8 is a diagram illustrating a generating of a line for each cell group, according to one embodiment.

FIG. 8 is a diagram illustrating a generating of a line for each cell group 701 of FIG. 7, according to one embodiment. As shown, FIG. 8 depicts an example in which the representation line for each cell group 701 is drawn to shown the smoothed edges of the detected object. For example, cell group 701a is used to generate a smoothed line 801a, cell group 701b is used to generate a smoothed line 801b, cell group 701c is used to generate a smoothed line 801c, cell group 701d is used to generate a smoothed line 801d, and cell group 701e is used to generate a smoothed line 801e. Each of the lines 801a-801e (also collectively referred to as lines 801) represents a prediction for one of the edges of a polygon representing the detected object (e.g. the sign 403). However, at this stage, the lines 801 still remain as distinct edges rather than a coherent polygon.

To combine the lines 801, the computer vision system 103 uses the predicted centroid 803 or center point to fill in the half plane on the side of each line 801 that lies to the center of the polygon to be constructed. For example, in step 307, the computer vision system 103 constructs a polygon to represent the detected object based on half planes coincident with the centroid predicted by one or more of the cells in each cell group 701. In one embodiment, each half plane is created by bisecting a plane with the line 801 generated for each cell group 701. In one embodiment, the computer vision system 103 can calculate an average predicted centroid for each cell group 701 by averaging the predicted centroid for each cell of said cell group 701. The computer vision system 103 then determines each half plane of each cell group that is coincident based on a location of the average predicted centroid for said each cell group. In one embodiment, the selected set of half planes ($HP_{selected}$) can be denoted as:

$$HP_{Selected} = \{HP_{n,x} | HP_{n,x} \in, HP_{n,x} \cap \text{Centroid}\}, \text{ for } i=1 \text{ to } n \text{ lines}$$

where $HP_{n,x}$ is a half-plane x created by a line n that is included in the set when the half-plane x is coincident with the predicted centroid of the detected object.

Figure 9A:
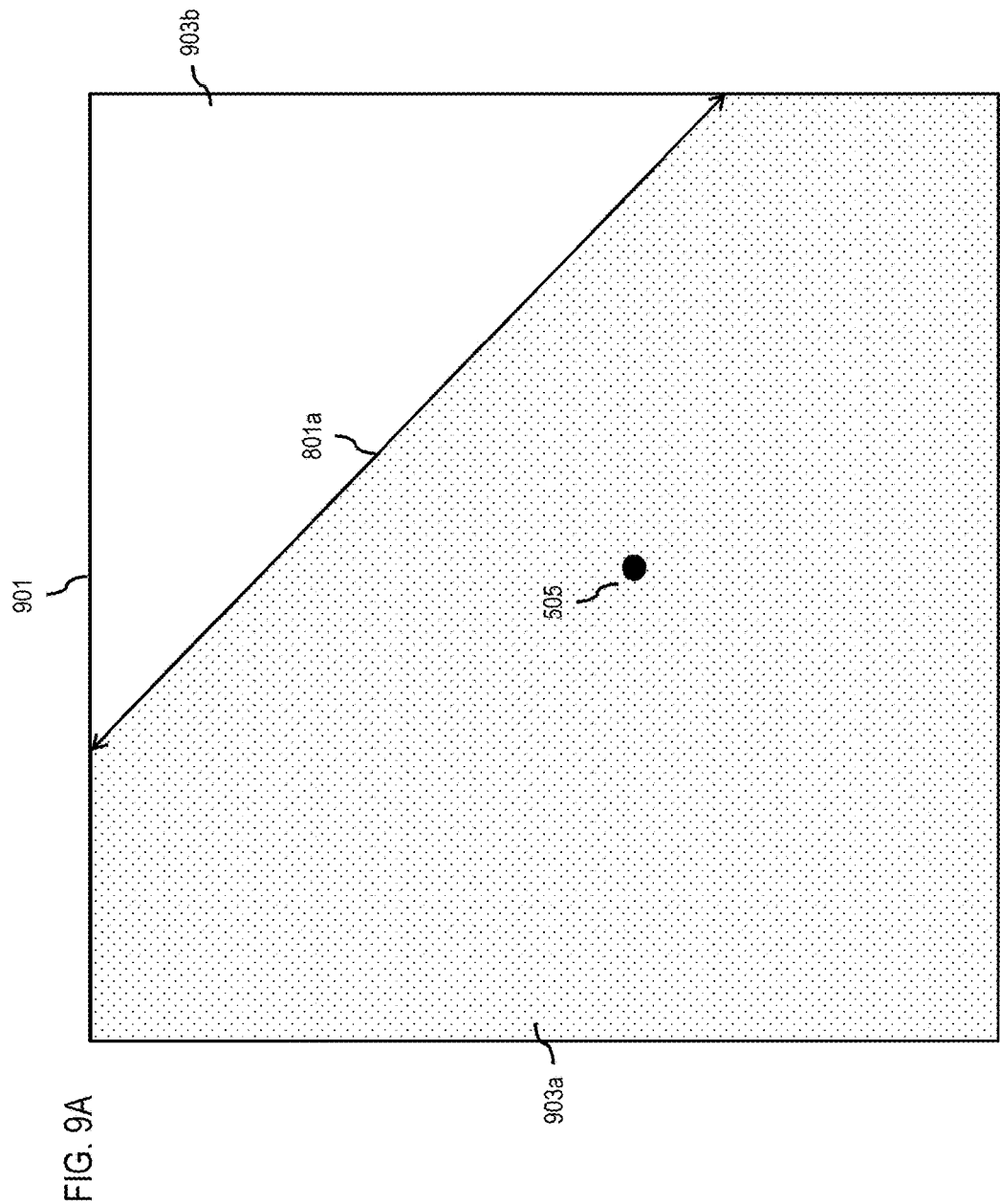
Figure 9B:
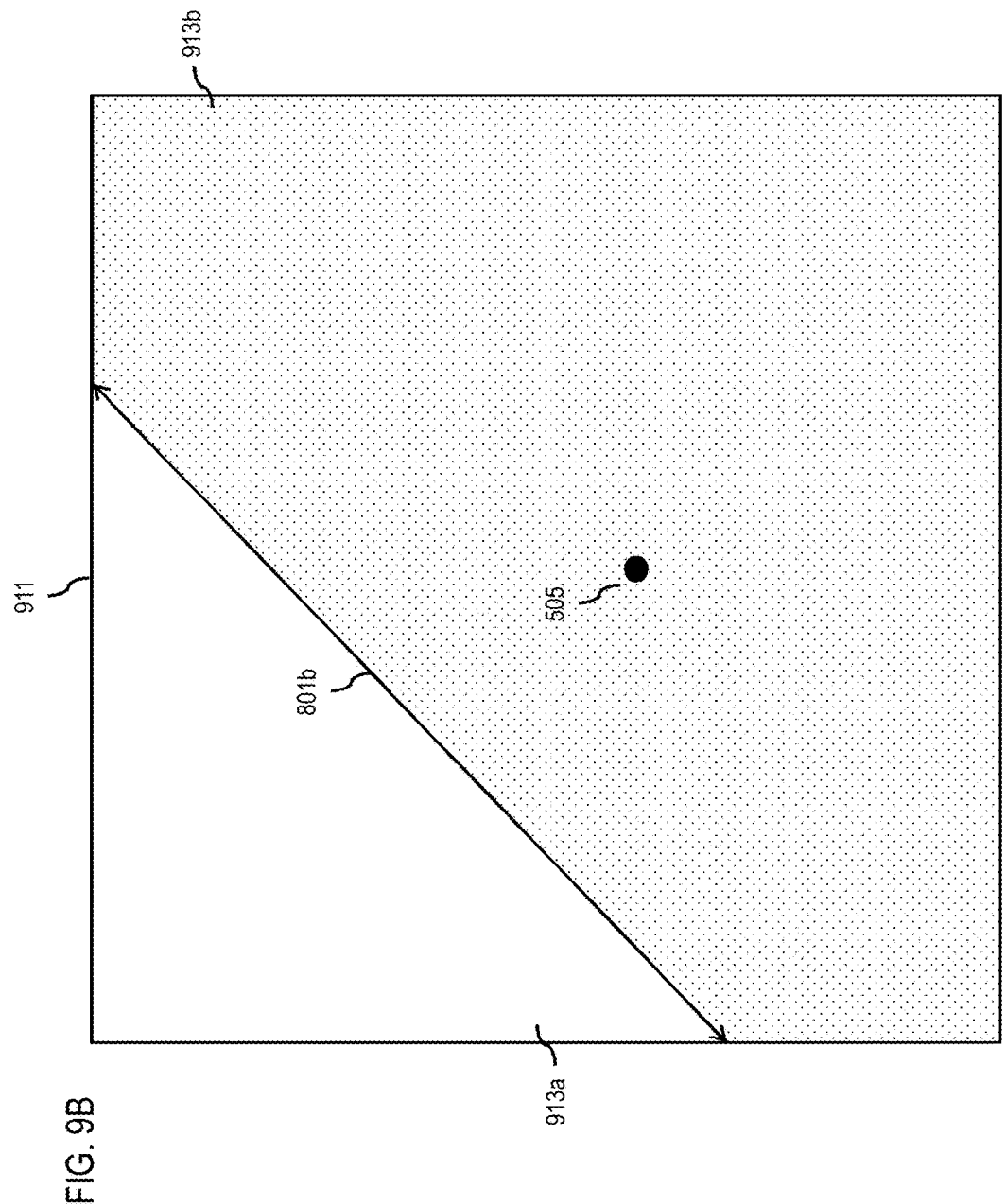
Figure 9C:
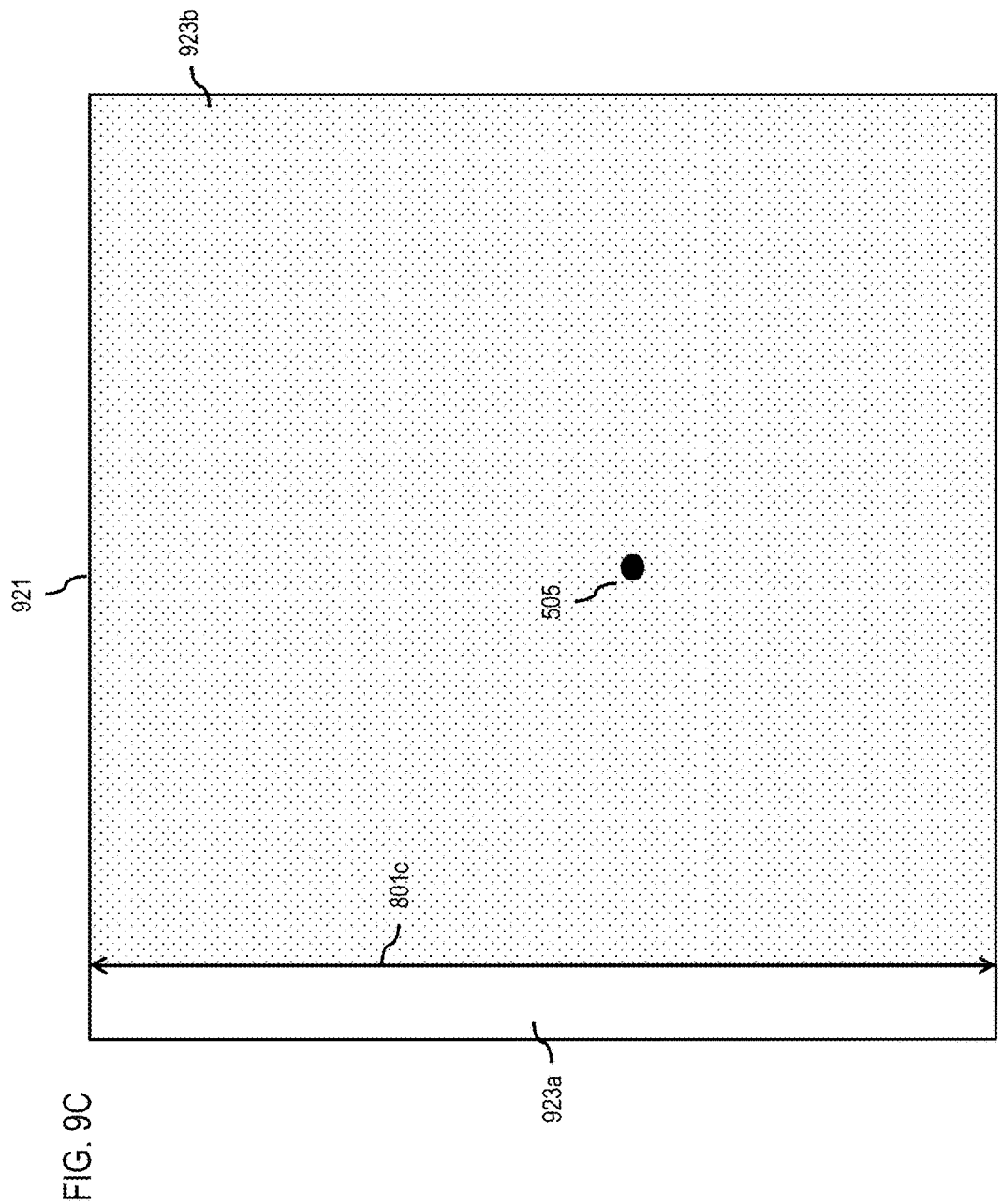
Figure 9D:
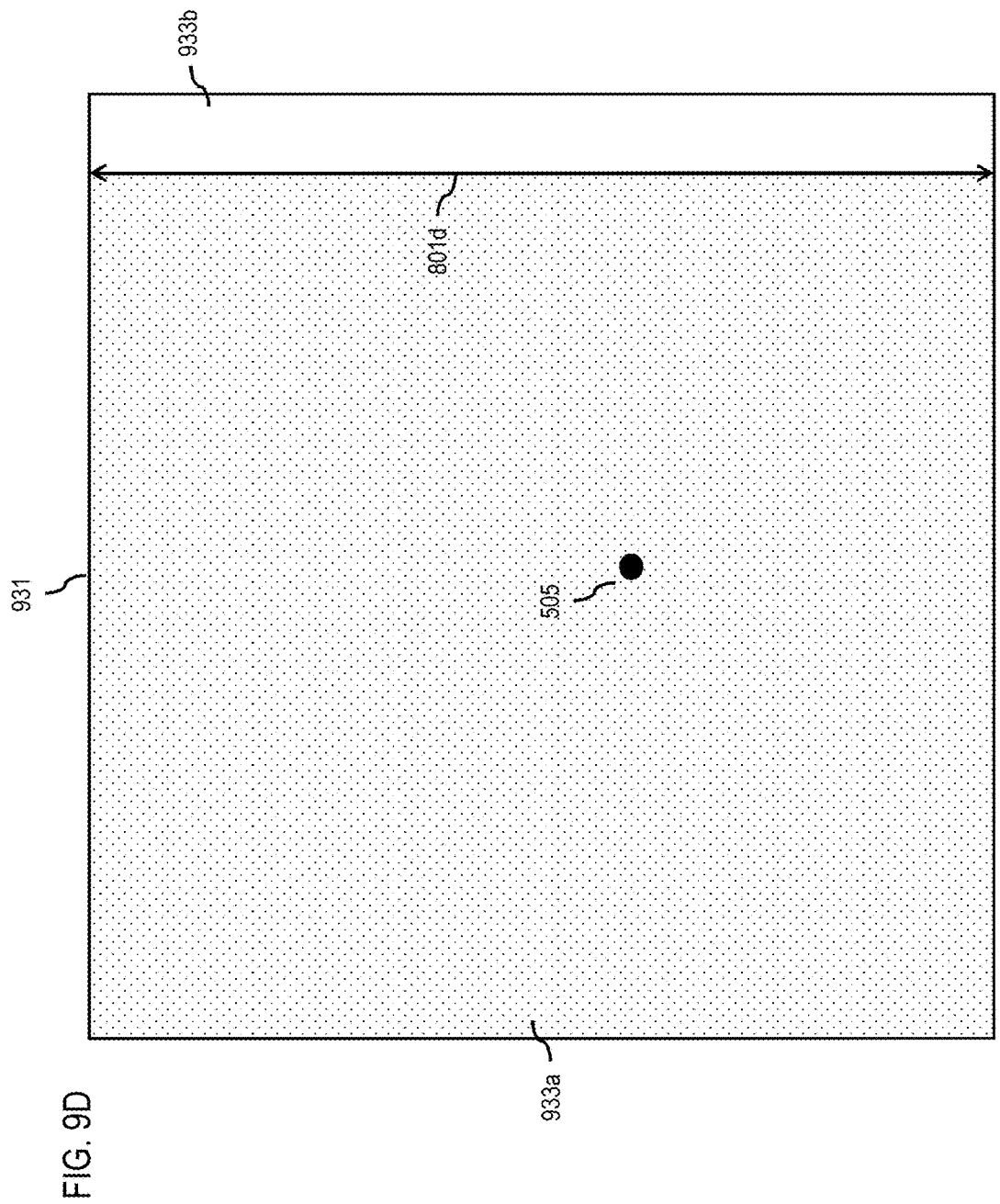

FIGS. 9A-9B are diagrams illustrating examples of creating and selecting half-planes that are coincident with a predicted centroid of a detected object, according to one embodiment. FIG. 9A depicts using the line 801a generated for cell group 701a to bisect a plane 901 into half planes 903a and 903b. The computer vision system 103 selects half plane 903a (e.g., filled in) because it is coincident with the predicted centroid 505 of the detected object. Coincident, for instance, refers to the centroid 505 being located on the same side of the bisecting line 801a as the selected half-plane 903a. FIGS. 9B-9E depict examples respect to the remaining lines 801b-801e associated respectively with cell groups 701b-701e. For example, FIG. 9B depicts using the line 801b generated for cell group 701b to bisect a plane 911 into half planes 913a and 913b. The computer vision system 103 then selects the half plane 913b (e.g., filled in) because it is coincident with the predicted centroid 505. FIG. 9C depicts using the line 801c generated for cell group 701c to bisect a plane 921 into half planes 923a and 923b. The computer vision system 103 then selects the half plane 923b (e.g., filled in) because it is coincident with the predicted centroid 505. FIG. 9D depicts using the line 801d generated for cell group 701d to bisect a plane 931 into half planes 933a and 933b. The computer vision system 103 then selects the half plane 933a (e.g., filled in) because it is coincident with the predicted centroid 505. Finally, FIG. 9E depicts using the line 801e generated for cell group 701e to bisect a plane 941 into half planes 943a and 943b. The computer vision system 103 then selects the half plane 943a (e.g., filled in) because it is coincident with the predicted centroid 505. The selected set of half planes $HP_{selected}$ resulting from the example of FIGS. 9A-9E is as follows:

$$HP_{Selected} = \{HP903a, HP913b, HP923b, HP933a, HP943a\}$$

Figure 10A:
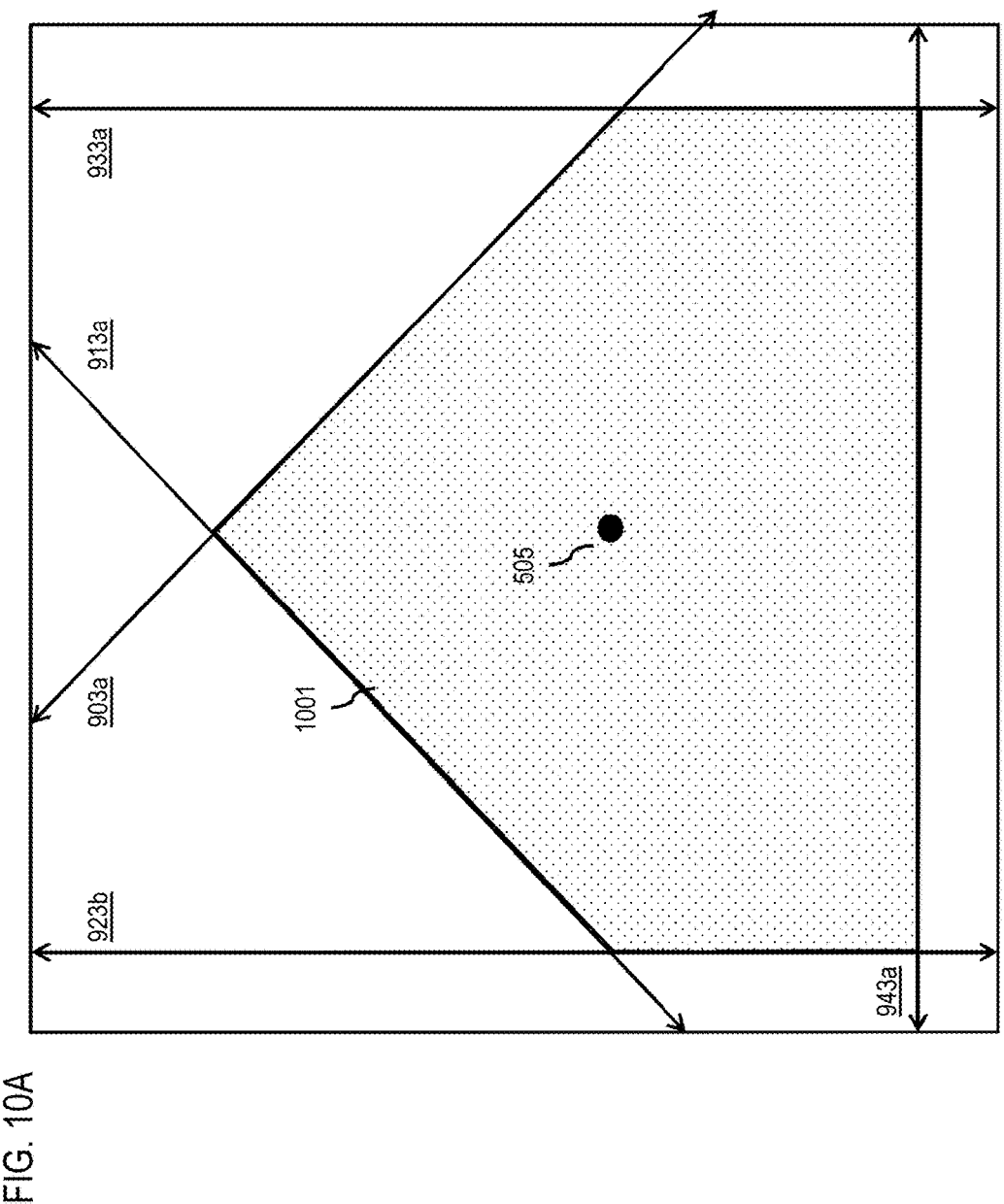
FIGS. 10A and 10B are diagrams illustrating a constructing of a polygon based half-planes for cell group, according to one embodiment.

In one embodiment, the computer vision system 103 determines an intersection of the plurality of half planes that is coincident with the predicted centroid for the one or more of said each cell. The intersection represents the area of all the half planes that overlap each other. An example of this intersection is shown in FIG. 10A which depicts an intersection 1001 of the half planes 903a, 913b, 923b, 933a, and 943a selected as coincident with the centroid 505 in the example of FIGS. 9A-9E. In one embodiment, the polygon is then constructed based on the intersection. For example, the computer vision system 103 can designate the intersection of the plurality of half planes (e.g., intersection 1001) as an interior of the polygon. In one embodiment, the designation of the polygon interior, $p_{int}$, can be denoted as:

$$p_{int} = \cap \text{ of all } HP_{n,x} \text{ in } \{HP_{n,x} | HP_{n,x} \in, HP_{n,x} \cap \text{Centroid}\}, \text{for } i=1 \text{ to } n \text{ lines}$$

where $HP_{n,x}$ is a half-plane x created by a line n that is included in the set when the half-plane x is coincident with the predicted centroid of the detected object.

Figure 10B:
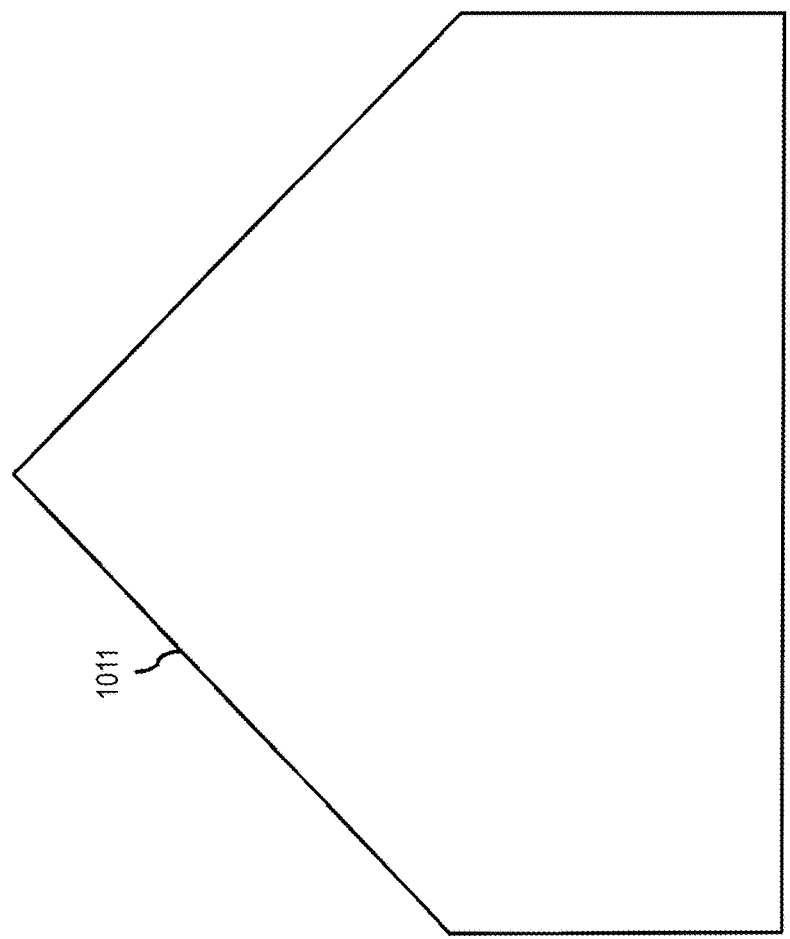

The polygon is then constructed based on a boundary of the intersection designated as the interior. FIG. 10B depicts a polygon 1011 constructed from the intersection 1001 to represent the detected object (e.g., the sign 403). In one embodiment, to construct the boundary, the computer vision system 103 can trace the perimeter of the intersection 1001 or polygon interior, take an intersection of the intersection 1001 and the edge lines 801, determine the vertices of the intersection 1001 to define a polygon having the determined vertices, and/or any other equivalent process. In one embodiment, the polygon 1011 is a closed polygon derived from the initial cell-based parametric representation 501 of the detected object (e.g., the sign 403).

Figure 11A:
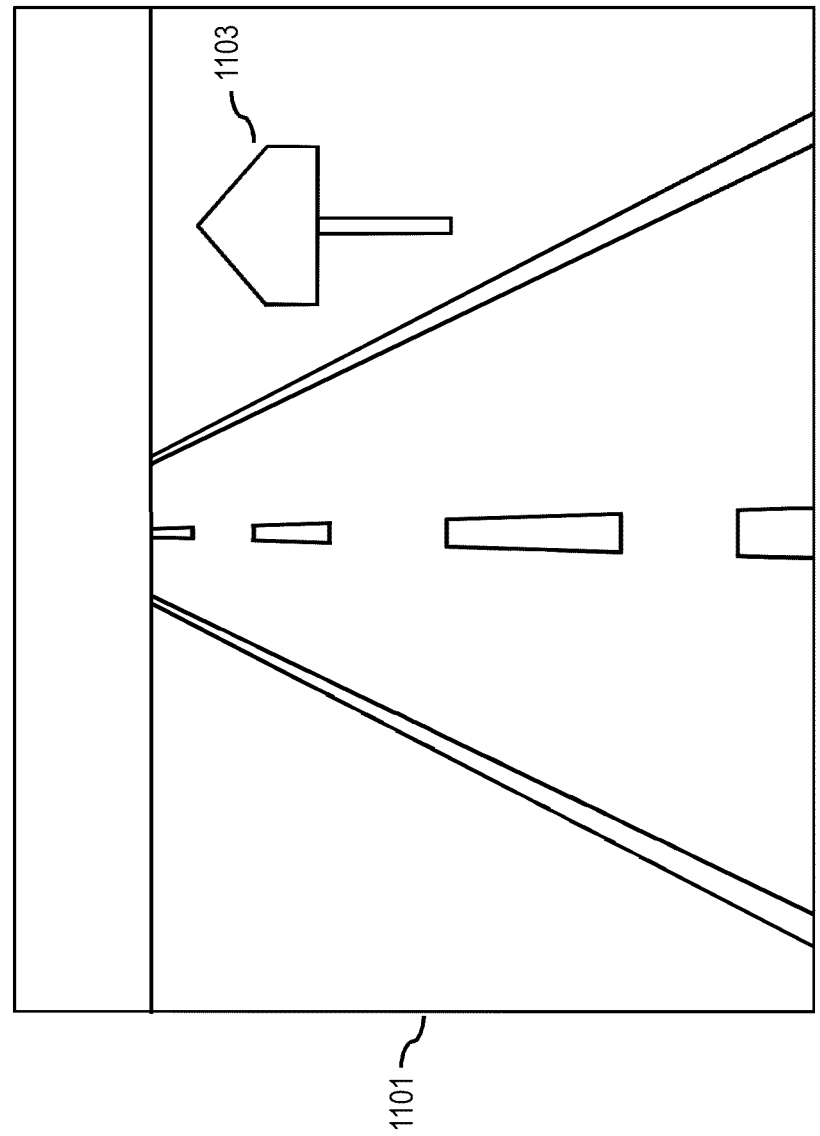
FIGS. 11A and 11B are diagrams illustrating an example use case of a vertex-based polygon similarity evaluation for vehicle localization using visual odometry, according to one embodiment.
Figure 11B:
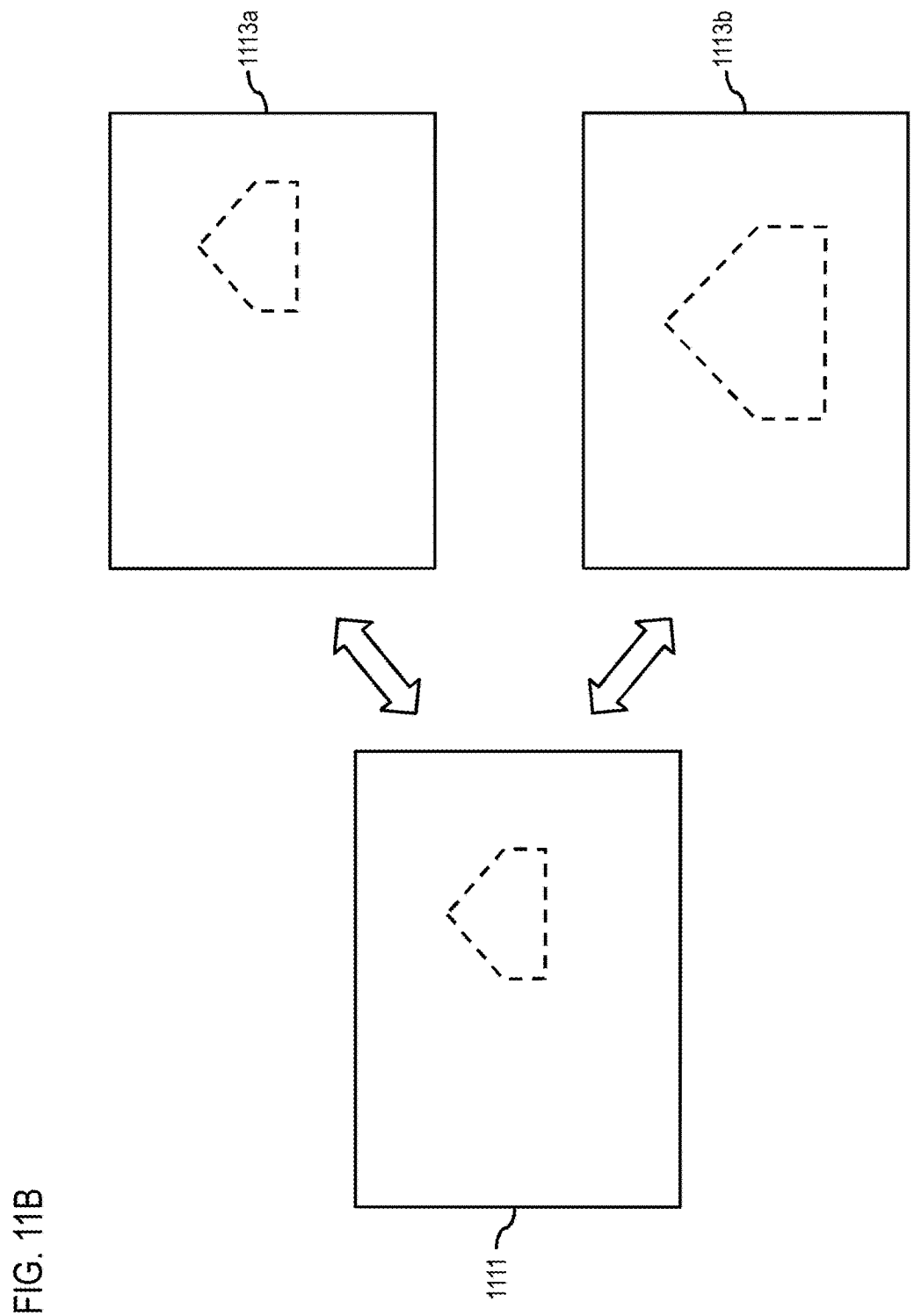

In step 309, the computer vision system 103 optionally transmits the polygon over a network to a mapping platform (e.g., a services platform 109 supporting mapping, navigation, and/or other location-based services) to determine a vehicle location using visual odometry. FIGS. 11A and 11B are diagrams illustrating an example use case of a vertex-based polygon similarity evaluation for vehicle localization using visual odometry, according to one embodiment. As shown, FIG. 11A illustrates an image 1101 captured by a camera of a vehicle 101 traveling on a roadway. The computer vision system 103 detects an object of interest (e.g., a road sign 1103) in the image whose location is known (e.g., location stored in geographic database 105) and that can be used for visual odometry. The computer vision system 103 recognizes the road sign 1103 and creates a polygonal representation 1111 of the road sign 1103 as shown in FIG. 11B. In one embodiment, the polygonal representation 1111 is constructed from polygon edges according to the various embodiment described herein to the shape of the detected object.

The computer vision system 103 can then retrieve ground truth representations 1113a and 1113b that depict the known road sign 1103 from different known camera poses. For example, ground truth representation 1113a includes a polygon representing the road sign 1103 as it would appear from a first known distance and camera pose, and ground truth representation 1113b includes a polygon representing the road sign 1103 as it would appear from a second known distance and camera pose. The computer vision system 100 then evaluates the polygon similarity between the detected polygon 1111 against each of the ground truth polygons 1113a and 1113b using any known polygon similarity evaluation or metric. In the field of object detection, one traditional metric for evaluating the similarity between two polygons can include, but is not limited to, an Intersection-over-Union (IoU) or the Jaccard Index. In this metric, the area of the intersection of two polygons is divided by the area of their union to indicate how similar the two polygons are. For example, two polygons which are completely disjointed would have IoU equal to zero, while two co-incident polygons would have IoU equal to one. Typically, a threshold is set (e.g., 0.5) below which the two polygons are said to be dissimilar; otherwise the polygons are said to be similar. The distance and camera pose of the ground truth polygon 1113a or 1113b with the greatest polygon similarity can then be selected as the camera pose of the detected polygon 1111 and corresponding road sign 1103 to localize the vehicle 101.

Another example use case of the embodiments of the process 300 (i.e., process for constructing polygons from detected edges) includes, but is not limited to, polygon validation. In other words, the various embodiments of the polygon construction described herein can be used to determine whether a there are a sufficient number of detected edges (e.g., resulting from an object detection of an input image) to create a polygon (e.g., a closed polygon). For example, if the intersection of half-planes created by the detected edges is not completely bounded (e.g., to define a bounded interior of a polygon), then the polygon is not closed. The computer vision system 103 can then designate that the resulting polygon or the edges from which the candidate polygon was constructed are not valid. In one embodiment, the computer vision system 103 can then re-initiate a determination of the edges or determine that the detected object is not a valid object.

Returning to FIG. 1, as shown, the system 100 includes a computer vision system 103 configured to perform the functions associated with generating and/or decoding the parametric representations of signs detected in an input image according to the various embodiments described herein. In one embodiment, the computer vision system 103 includes a neural network or other machine learning/parallel processing system to automatically detect features such as signs in image data to support localization of, e.g., a vehicle 101 within the sensed environment. In one embodiment, the neural network of the computer vision system 103 is a traditional convolutional neural network consisting, for instance, of multiple layers of collections of one or more neurons which are configured to process a portion of an input image. In one embodiment, the receptive fields of these collections of neurons (e.g., a receptive layer) can be configured to correspond to an area of an input image delineated by a respective a grid cell generated as described above.

In one embodiment, the computer vision system 103 also has connectivity or access to a geographic database 105 which represents mapped geographic features to facilitate visual odometry to increase localization accuracy. The geographic database 105 can also store parametric representations of signs and other similar features and/or related data generated or used to encode or decode parametric representations of signs according to the various embodiments described herein.

In one embodiment, the computer vision system 103 has connectivity over a communication network 107 to a services platform 109 that provides one or more services 111a-111n (also collectively referred to as services 111). By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the computer vision system 103 (e.g., parametric representations of lane lines) to localize the vehicle 101 or a user equipment 113 (e.g., a portable navigation device, smartphone, portable computer, tablet, etc.) to provide services 111 such as POI recommendations, advertising intelligence, etc.

In one embodiment, the computer vision system 103 may be a platform with multiple interconnected components. The computer vision system 103 may include multiple servers, intelligent networking devices, computing devices, components and corresponding software for providing parametric representations of signs. In addition, it is noted that the computer vision system 103 may be a separate entity of the system 100, a part of the one or more services 111, a part of the services platform 109, or included within the UE 113 and/or vehicle 101.

In one embodiment, content providers 115a-115m (collectively referred to as content providers 115) may provide content or data (e.g., including geographic data, parametric representations of mapped features, etc.) to the geographic database 105, the computer vision system 103, the services platform 109, the services 111, the UE 113, the vehicle 101, and/or an application 117 executing on the UE 113. The content provided may be any type of content, such as map content, textual content, audio content, video content, image content, etc. In one embodiment, the content providers 115 may provide content that may aid in the detecting and classifying of lane lines and/or other features in image data. In one embodiment, the content providers 115 may also store content associated with the geographic database 105, computer vision system 103, services platform 109, services 111, UE 113, and/or vehicle 101. In another embodiment, the content providers 115 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the computer vision system 103.

In one embodiment, the UE 113 and/or vehicle 101 may execute a software application 117 to collect, encode, and/or decode signs detected in image data into the parametric representations according to the embodiments described herein, and to construct polygons from the representations for object detection according to the embodiments described herein. By way of example, the application 117 may also be any type of application that is executable on the UE 113 and/or vehicle 101, such as autonomous driving applications, mapping applications, location-based service applications, navigation applications, content provisioning services, camera/imaging application, media player applications, social networking applications, calendar applications, and the like. In one embodiment, the application 117 may act as a client for the computer vision system 103 and perform one or more functions of the computer vision system 103 alone or in combination with the system 103.

By way of example, the UE 113 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 113 can support any type of interface to the user (such as "wearable" circuitry, etc.). In one embodiment, the UE 113 may be associated with the vehicle 101 or be a component part of the vehicle 101.

In one embodiment, the UE 113 and/or vehicle 101 are configured with various sensors for generating or collecting environmental image data (e.g., for processing the computer vision system 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 113 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 113 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 113 and/or vehicle 101 may include GPS or other satellite-based receivers to obtain geographic coordinates from satellites 119 for determining current location and time. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the geographic database 105, computer vision system 103, services platform 109 (e.g., a mapping platform), services 111, UE 113, vehicle 101, and/or content providers 115 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
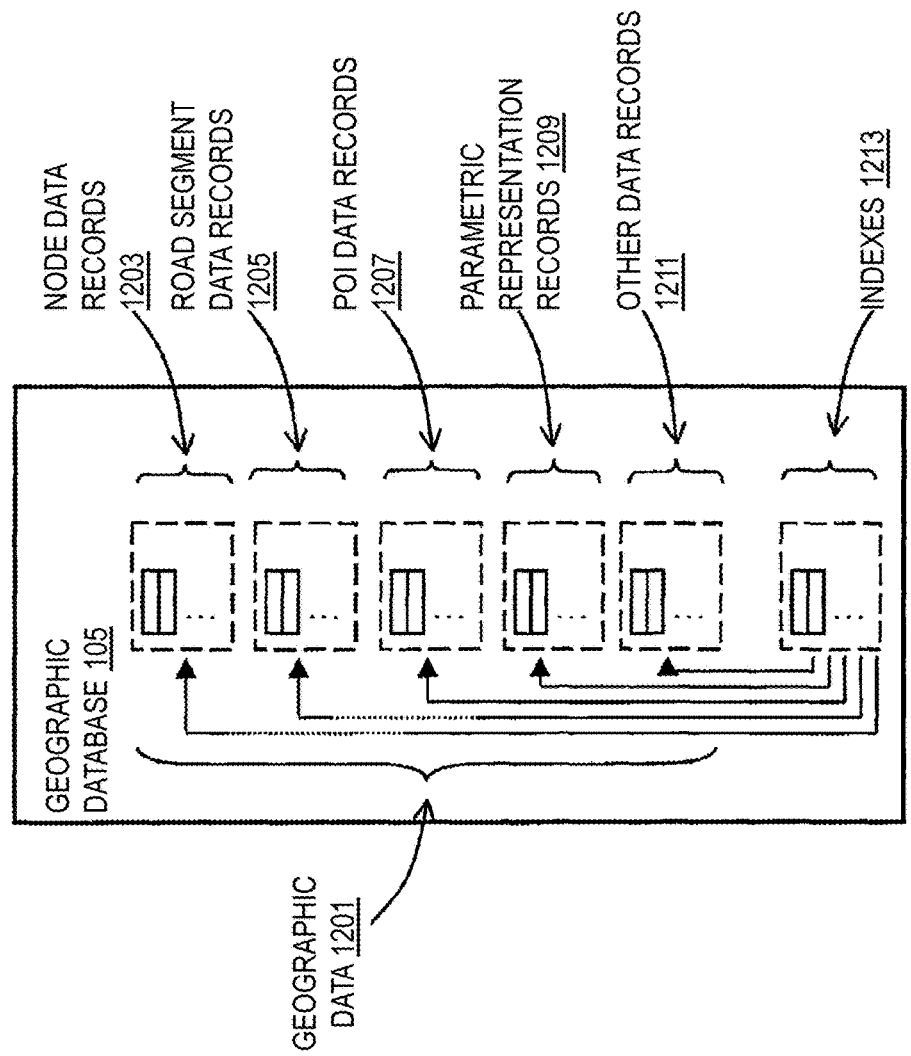
FIG. 12 is a diagram of a geographic database, according to one embodiment.

FIG. 12 is a diagram of a geographic database, according to one embodiment. In one embodiment, the geographic database 105 includes geographic data 1201 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 1203, road segment or link data records 1205, POI data records 1207, parametric representation records 1209, other records 1211, and indexes 1213, for example. More, fewer or different data records can be provided. In one embodiment, additional data records (not shown) can include cartographic ("carto") data records, routing data, and maneuver data. In one embodiment, the indexes 1213 may improve the speed of data retrieval operations in the geographic database 105. In one embodiment, the indexes 1213 may be used to quickly locate data without having to search every row in the geographic database 105 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points corresponding to the respective links or segments of the road segment data records 1205. The road link data records 1205 and the node data records 1203 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 1207. The geographic database 105 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In one embodiment, the geographic database 105 can also include parametric representations records 1209 for storing parametric representations of the objects detected from input image data according to the various embodiments described herein. The parametric presentations records 1209 can also include data structures storing polygons constructed from object edges or line segments encoded or predicted in the parametric representations. In one embodiment, the parametric representation records 1209 can be associated with one or more of the node records 1203, road segment records 1205, and/or POI data records 1207 to support localization or video odometry based on the features stored therein and the generated parametric representations of lane lines of the records 1209. In this way, the parametric representation records 1209 can also be associated with the characteristics or metadata of the corresponding record 1203, 1205, and/or 1207.

In one embodiment, the geographic database 105 can be maintained by the content provider 115 in association with the services platform 109 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 113) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 13:
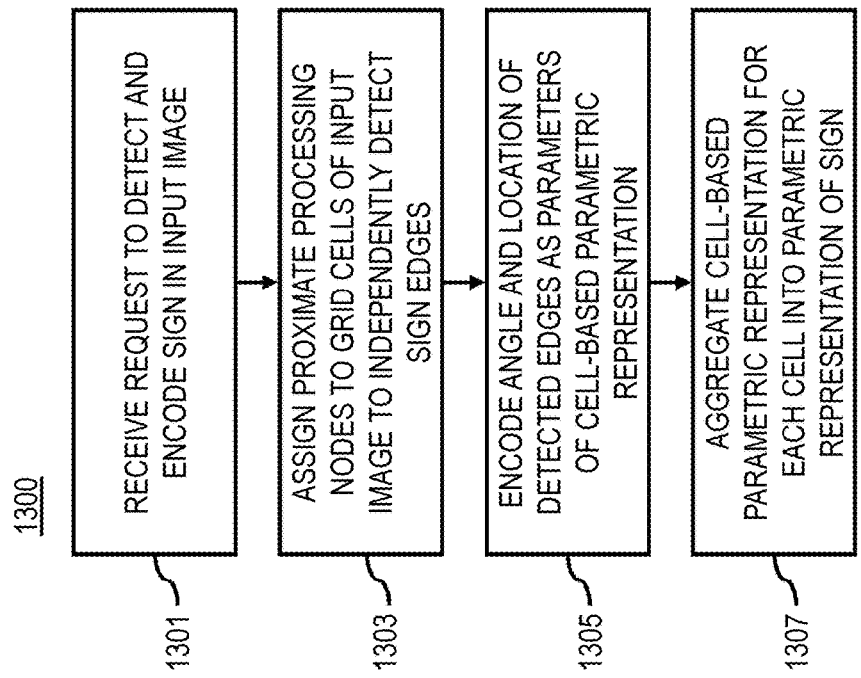
FIG. 13 is a flowchart of a process for generating a parametric representation of signs detected in an input image, according to one embodiment.

FIG. 13 is a flowchart of a process for generating a parametric representation of signs detected in an input image, according to one embodiment. In one embodiment, the computer vision system 103 may perform one or more portions of the process 1300 and may be implemented in, for instance, a chip set including a processor and a memory as shown in FIG. 15. As such, the computer vision system 103 can provide means for accomplishing various parts of the process 1300. In addition or alternatively, the services platform 109 and/or services 111 may perform any combination of the steps of the process 1300 in combination with the computer vision system 103 or as standalone components. Although the process 1300 is illustrated and described as a sequence of steps, it is contemplated that various embodiments of the process 1300 may be performed in any order or combination and need not include all of the illustrated steps.

In step 1301, the computer vision system 103 receives a request to detect and encode at least one sign depicted in an input image into a parametric representation of the at least one sign. In one embodiment, the request is initiated as part of a real-time environmental sensing function of the computer vision system 103 to support, for instance, autonomous or semi-autonomous vehicle operation (e.g., operation of the vehicle 101). For example, the input image can be part of an image capture stream (e.g., from an onboard camera of a vehicle 101) to support video odometry to more accurately localize the vehicle 101 (e.g., localized to within 10 cm accuracy).

In step 1303, the computer vision system 103 assigns respective one or more processing nodes of the computer vision system to independently process each respective grid cell of the input image to detect at least one edge of the at least one sign. For example, each processing node can be trained (e.g., using machine learning techniques) to detect sign edges (e.g., indicated as a position and angle of a line segment or other geometric representation corresponding to a detected sign edge), sign faces (e.g., the portion of the image corresponding to a sign surface delineated by a sign edge), and/or other sign attributes. In one embodiment, each processing node is independently responsible for making a separate prediction of any edges falling within the image area bounded by the grid cells of the image for which it is responsible, without reference to data external to those cells or receiving input from neighboring processing nodes to facilitate its prediction.

In one embodiment, each respective grid cell is among a plurality of grid cells created by overlaying a grid onto the input image. For example, in one embodiment, the computer vision system 103 segments an input image into a plurality of grid cells, with one or more processing nodes of the computer vision system assigned to process the image data falling within the area of each grid cell. In one embodiment, the grid is comprised of regular shapes (e.g., square, rectangle, etc.), but it is contemplated that grid can also vary in size and/or shape from cell to cell. For example, in areas where higher resolution is needed (e.g., in the center of an image), smaller cells can be used to provide greater resolution. Similarly, larger cells can be used for the periphery of an image, where greater resolution may not be needed. In one embodiment, the resolution or size of the grid can vary with available processing power and/or desired accuracy/precision of the resulting object models of the signs. However, because the parametric representations described herein are vector based, rasterization of these representations can yield relatively accurate results at a wide range of pixel resolutions. Accordingly, in one embodiment, the grid resolution can be a relatively low level (e.g., 50×38) to advantageously reduce computational resource requirements.

In one embodiment, the computer vision system 103 assigns said processing nodes based on a proximity of the nodes to each respective grid cell. In other words, as previously described, each processing node can process the image data from the cell to which it is assigned as well the image data from neighboring cells within proximity of its first assigned cell. In one embodiment, the computer vision system 103 can apply a distance threshold (e.g., within 1.5 cells, 2 cells, etc.) to determine which grid cells of input image data a particular processing node is to process to detect sign edges, sign faces, etc. according to the various embodiments described herein.

In one embodiment, there are more than one of said processing nodes assigned to process the respective grid cell to generate a plurality of redundant cell-based parametric representations for said each respective grid cell (e.g., when a distance threshold is applied as described above and below). The computer vision system 103 can then process the plurality of redundant cell-based parametric representations are processed into a single cell-based parametric representation to represent the cell-based parametric representation for said each respective grid cell. By way of example, the processing of these redundant representations may include averaging, weighting, smoothing, and/or any other equivalent method to calculate a representative cell-based parametric representation from the redundant results. This single or representative cell-based parametric representation generally is more robust than any individual representation.

For example, multiple nodes are assigned with the applied distance threshold for assigning processing nodes is greater than 1 cell. As the distance threshold increases, the number of assigned processing nodes also increases because larger distance thresholds also means there are a larger number of neighboring cells/processing nodes that fall within that threshold. However, larger distance thresholds can also increase the overall processing load of each individual processing node because the node would be responsible for processing a larger area of the input image. In one embodiment, the computer vision system 103 can vary the distance threshold to balance the robustness obtained from redundant or multiple predictions (e.g., multiple cell-based parametric representations) against available computational resources to handle the additional processing load.

In one embodiment, a cell-based parametric representation includes a plurality of output channels. Each of the plurality of output channels, for instance, corresponds to an edge detector that is responsible for a different range of edge angles. As previously discussed, by narrowing the angular range for which any individual edge detector (e.g., used for a given cell or by a processing node assigned to the cell) is responsible, that edge detector can be trained to more accurately or precisely detect such edges (i.e., become an "expert" in detecting or recognizing edges within the assigned angular range from input image data). In one embodiment, the computer vision system 103 can configure the number of output channels to use by balancing the improved detection capabilities resulting from more narrowly focused edge detectors against the increased computational resource requirements incurred from having an increased number of channels/detectors. For example, the system can be configured with any number of channels that cover any angular range (e.g., 8 output channels with each covering 45 degree angular ranges to cover a full 360 degrees, or 10 output channels with each covering 36 degree angular ranges to cover a full 360 degrees). In one embodiment, an edge angle is determined with respect to a reference angle in each cell and with respect to which side of the edge the sign face is predicted to be.

In step 1305, the computer vision system 103 encodes, by said respective processing nodes, an angle and a location of a detected at least one edge as edge parameters of a cell-based parametric representation for said each respective grid cell. In one embodiment, the computer vision system 103 determines a reference point and a reference angle for said each respective grid cell from which the angle and/or location are specified. In one embodiment, the reference point is a centroid of an area of said each respective grid cell that represents image data corresponding to the at least one sign. The computer vision system 103 then encodes the location of the detected at least one edge as a distance along a line segment drawn from the reference point to the detected at least one edge, wherein the line segment is perpendicular to the detected at least one edge. The computer vision system 103 also encodes the angle of the detected at least one edge in relation to the reference angle. For example, with this encoding scheme, the computer vision system 103 can represent a detected edge parametrically using the following representation comprising a minimum of two parameters: <radius>, <angle>.

In one embodiment, the computer vision system 103 determines a confidence value associated with the detected at least one edge. As described above, the confidence value indicates a probability computed by the processing node that the detected edge is an actual edge of the sign (e.g., 1=high probability, 0=no probability). In one embodiment, the confidence value is further encoded into the cell-based parametric representation, to result in an edge representation comprising a minimum of three parameters: <confidence>, <radius>, <angle>.

In step 1307, the computer vision system 103 aggregates the cell-based parametric representation for said each respective grid cell in which the at least one edge of the at least one sign is detected to output the parametric representation of the at least one sign. In one embodiment, the overall parametric representation of the at least one sign can be a collection of the edge detection results for all grid cells covering the entire input image and/or just a portion of the image corresponding to cells in which sign edges are detected. In addition, when multiple signs are detected in the input image, a separate aggregation or collection of the cell-based parametric representations corresponding to each separate detected sign can be provided as outputs.

The processes described herein for constructing a polygon from edges for object detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
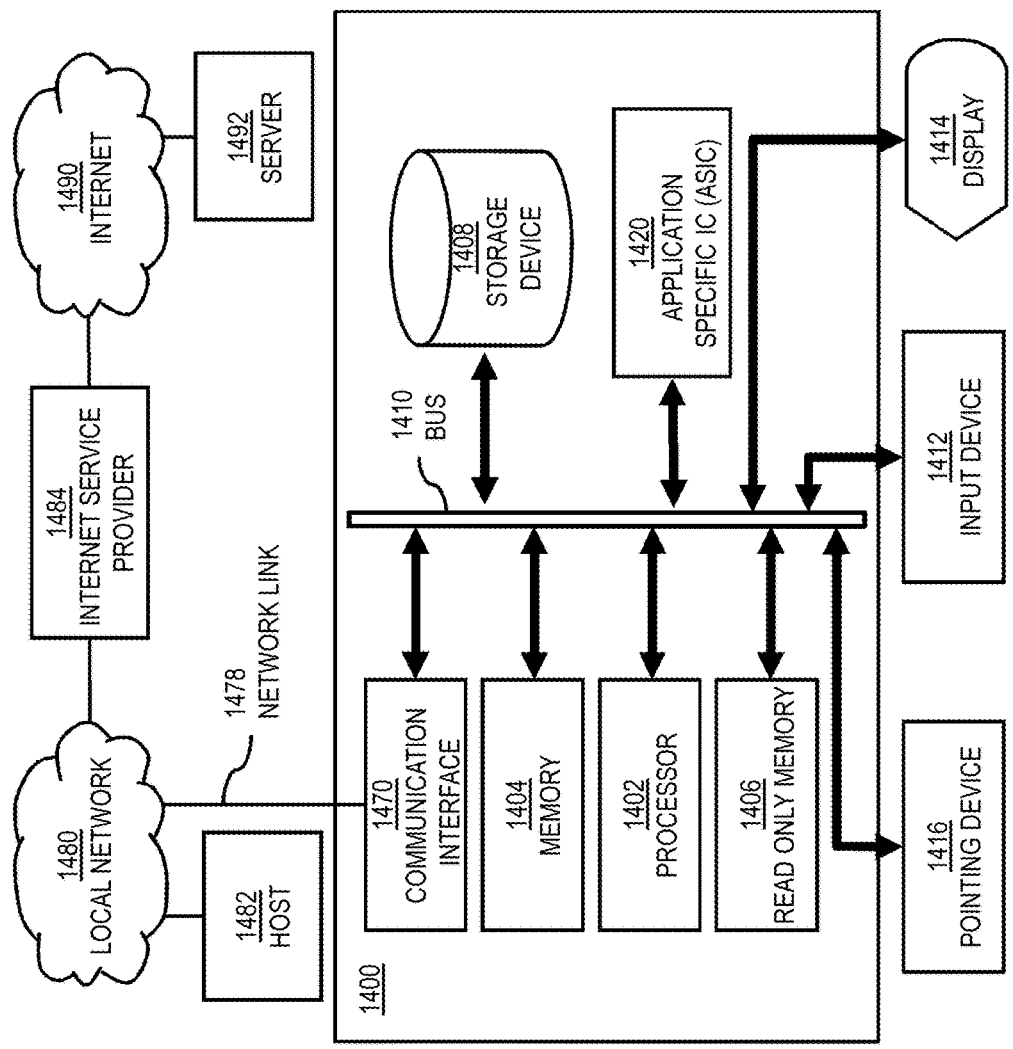
FIG. 14 is a diagram of hardware that can be used to implement an embodiment of the invention.

FIG. 14 illustrates a computer system 1400 upon which an embodiment of the invention may be implemented. Computer system 1400 is programmed (e.g., via computer program code or instructions) to construct a polygon from edges for object detection as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to constructing a polygon from edges for object detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for constructing a polygon from edges for object detection. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for constructing a polygon from edges for object detection, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communications network 107 for constructing a polygon from edges for object detection.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to construct a polygon from edges for object detection as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to construct a polygon from edges for object detection. The memory 1505 also stores the data associated with or generated by the execution of the inventive steps.

Figure 16:
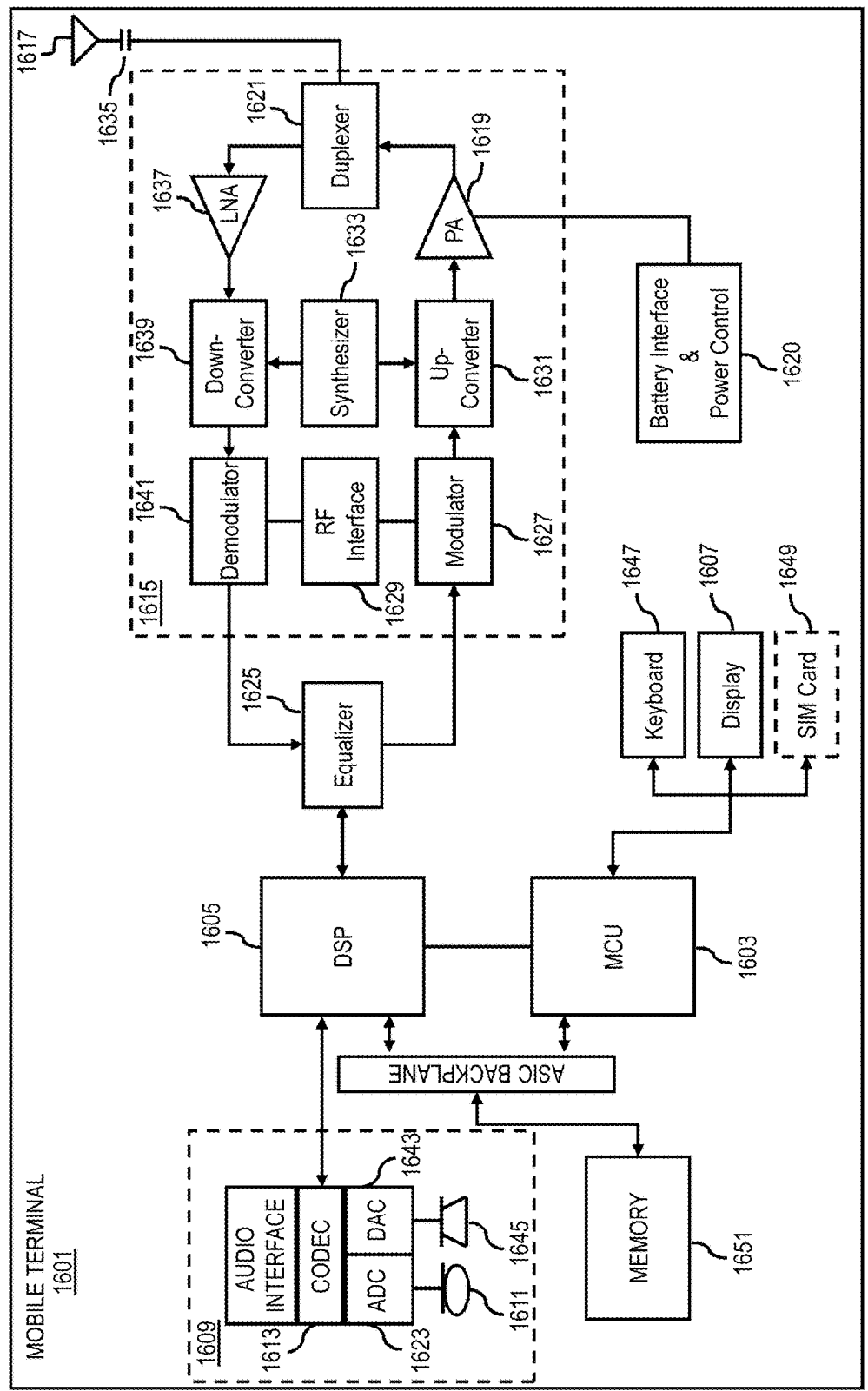
FIG. 16 is a diagram of a mobile terminal (e.g., handset) that can be used to implement an embodiment of the invention.

FIG. 16 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to construct a polygon from edges for object detection. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1651 may be, but not limited to, a single memory, CD, DVD, ROM, RAM, EEPROM, optical storage, or any other non-volatile or non-transitory storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for constructing a polygon to represent an object detected by a computer vision system comprising:
   processing, by the computer vision system, an image to generate a cell-based parametric representation of one or more edges of the object as depicted in the image, wherein the cell-based parametric representation segments the image into a plurality of cells, and wherein each cell of the plurality of cells includes a predicted line segment representing a portion of the one or more edges, and a predicted centroid of the object;
   grouping the plurality of cells into a plurality of cell groups based on the predicted line segment for said each cell;
   generating a line to represent each cell group of the plurality of cell groups based on the predicted line segment for said each cell of said each cell group; and
   constructing the polygon to represent the object based on a plurality of half planes coincident with the predicted centroid for one or more of said each cell,
   wherein each half plane of the plurality of half planes is created by bisecting a plane with the line generated for said each cell group.

2. The method of claim 1, wherein the predicted line segment includes a predicted angle of the predicted line segment, and wherein the plurality of cells is grouped into the plurality of cell groups based on the predicted angle of said each cell.

3. The method of claim 1, further comprising:
   determining an intersection of the plurality of half planes that is coincident with the predicted centroid for the one or more of said each cell,
   wherein the polygon is constructed based on the intersection.

4. The method of claim 3, further comprising:
   designating the intersection of the plurality of half planes as an interior of the polygon,
   wherein the polygon is constructed based on a boundary of the intersection designated as the interior.

5. The method of claim 1, wherein the predicted line segment includes a predicted angle and a predicted location of the line segment, and wherein the line to represent said each cell group is generated based on the predicted angle and the predicted location of said each cell.

6. The method of claim 5, further comprising:
   calculating an average angle by averaging the predicted angle of the line segment, an average location by averaging the predicted location of the line segment, or a combination thereof for said each cell of said each cell group wherein the line to represent said each group is generated based on the average angle,
   wherein the line to represent said each cell group is generated based on the average angle and the average location of said each cell.

7. The method of claim 1, further comprising:
calculating an average predicted centroid for said each cell group by averaging the predicted centroid for said each cell of said each cell group; and
determining said each half plane of each cell group that is coincident based on a location of the average predicted centroid for said each cell group.

8. The method of claim 1, further comprising:
transmitting the polygon over a network to a mapping platform to determine a vehicle location using visual odometry.

9. An apparatus for constructing a polygon to represent an object detected by a computer vision system comprising:
at least one processor; and
at least one memory including computer program code for one or more programs,
the at least one memory and the computer program code configured to, with the at least one processor, cause the apparatus to perform at least the following,
process, by the computer vision system, an image to generate a parametric representation of one or more edges of the object as depicted in the image, wherein the parametric representation includes a predicted line segment representing at least a portion of the one or more edges, and a predicted centroid of the object;
generate a line to represent each of the one or more edges based on the predicted line segment; and
construct the polygon to represent the object based on a plurality of half planes coincident with the predicted centroid for said each of the one or more edges,
wherein each half plane of the plurality of half planes is created by bisecting a plane with the line generated for said each of the one or more edges.

10. The apparatus of claim 9, wherein the predicted line segment includes a predicted angle of the predicted line segment.

11. The apparatus of claim 9, wherein the apparatus is further caused to:
determine an intersection of the plurality of half planes that is coincident with the predicted centroid for said each of the one or more edges,
wherein the polygon is constructed based on the intersection.

12. The apparatus of claim 11, wherein the apparatus is further caused to:
designate the intersection of the plurality of half planes as an interior of the polygon,
wherein the polygon is constructed based on a boundary of the intersection designated as the interior.

13. The apparatus of claim 9, wherein the predicted line segment includes a predicted angle and a predicted location of the line segment, and wherein the line to represent said each one or more edges is generated based on the predicted angle and the predicted location of said each cell.

14. The apparatus of claim 13, wherein the apparatus is further caused to:
calculate an average angle by averaging the predicted angle of the line segment, an average location by averaging the predicted location of the line segment, or a combination thereof for said each of the one or more edges wherein the line to represent said each of the one or more edges is generated based on the average angle,
wherein the line to represent said each of the one or more edges is generated based on the average angle and the average location of said each cell.

15. The apparatus of claim 9, wherein the apparatus is further caused to:
calculate an average predicted centroid for said each of the one or more edges by averaging the predicted centroid for said each cell of said each cell group; and
determine said each half plane of each cell group that is coincident based on a location of the average predicted centroid for said each of the one or more edges.

16. A non-transitory computer-readable storage medium for constructing a polygon to represent an object detected by a computer vision system, carrying one or more sequences of one or more instructions which, when executed by one or more processors, cause an apparatus to perform:
processing, by the computer vision system, an image to generate a cell-based parametric representation of one or more edges of the object as depicted in the image, wherein the cell-based parametric representation segments the image into a plurality of cells, and wherein each cell of the plurality of cells includes a predicted line segment representing a portion of the one or more edges, and a predicted centroid of the object;
grouping the plurality of cells into a plurality of cell groups based on the predicted line segment for said each cell;
generating a line to represent each cell group of the plurality of cell groups based on the predicted line segment for said each cell of said each cell group; and
constructing the polygon to represent the object based on a plurality of half planes coincident with the predicted centroid for one or more of said each cell,
wherein each half plane of the plurality of half planes is created by bisecting a plane with the line for said each cell group.

17. The non-transitory computer-readable storage medium of claim 16, wherein the predicted line segment includes a predicted angle of the predicted line segment, and wherein the plurality of cells is grouped into the plurality of cell groups based on the predicted angle of said each cell.

18. The non-transitory computer-readable storage medium of claim 16, wherein the apparatus is caused to further perform:
determining an intersection of the plurality of half planes that is coincident with the predicted centroid for the one or more of said each cell,
wherein the polygon is constructed based on the intersection.

19. The non-transitory computer-readable storage medium of claim 18, wherein the apparatus is caused to further perform:
designating the intersection of the plurality of half planes as an interior of the polygon,
wherein the polygon is constructed based on a boundary of the intersection designated as the interior.

20. The non-transitory computer-readable storage medium of claim 16, wherein the predicted line segment includes a predicted angle and a predicted location of the line segment, and wherein the line to represent said each cell group is generated based on the predicted angle and the predicted location of said each cell.

* * * * *